US007944778B2

(12) United States Patent
Nakamiya

(10) Patent No.: US 7,944,778 B2
(45) Date of Patent: May 17, 2011

(54) MOTOR DRIVE CONTROL CIRCUIT, SEMICONDUCTOR DEVICE, ELECTRONIC TIMEPIECE, AND ELECTRONIC TIMEPIECE WITH A POWER GENERATING DEVICE

(75) Inventor: Shinji Nakamiya, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 486 days.

(21) Appl. No.: 12/062,237

(22) Filed: Apr. 3, 2008

(65) Prior Publication Data

US 2008/0253236 A1 Oct. 16, 2008

(30) Foreign Application Priority Data

Apr. 10, 2007 (JP) ................................ 2007-102862

(51) Int. Cl.
*G04F 5/00* (2006.01)
*G06F 1/04* (2006.01)
*H02P 8/38* (2006.01)

(52) U.S. Cl. ......................... 368/157; 368/204; 318/696

(58) Field of Classification Search .................... 368/64, 368/66, 80, 157, 159, 160, 203–204; 318/696
See application file for complete search history.

(56) References Cited

U.S. PATENT DOCUMENTS 4,882,717 A * 11/1989 Hayakawa et al. ............. 368/64
5,001,685 A * 3/1991 Hayakawa .................... 368/204
5,581,519 A * 12/1996 Hara et al. ...................... 368/64
5,835,457 A * 11/1998 Nakajima ..................... 368/204
5,881,028 A 3/1999 Higuchi et al.
6,211,657 B1 4/2001 Goluszek
6,278,663 B1 * 8/2001 Okeya et al. .................. 368/204
6,343,051 B1 * 1/2002 Yabe et al. ...................... 368/64
6,396,772 B1 * 5/2002 Yabe et al. .................... 368/204
6,466,519 B1 * 10/2002 Nakamura et al. .............. 368/64
6,522,603 B1 * 2/2003 Miyahara et al. ............ 368/203
6,584,043 B1 * 6/2003 Koike et al. .................. 368/204
6,636,459 B1 * 10/2003 Nagata .......................... 368/204
6,646,960 B1 * 11/2003 Nagata .......................... 368/204
6,693,851 B1 * 2/2004 Fujisawa et al. .............. 368/203
6,956,794 B2 * 10/2005 Nakamura et al. ............ 368/203
7,715,280 B2 * 5/2010 Murakami et al. .............. 368/64
2003/0128631 A1 * 7/2003 Nakamura et al. ............ 368/204

FOREIGN PATENT DOCUMENTS

EP 0 510 730 A2 10/1992
EP 1 055 981 A1 11/2000
EP 1 098 235 A2 5/2001
GB 2 406 450 3/2005
JP 07-306274 11/1995
JP 10-174494 6/1998
JP 10-304555 11/1998
JP 2001-171919 6/2001

* cited by examiner

*Primary Examiner* — Vit W Miska

(57) ABSTRACT

A motor drive control circuit that operates using a primary power supply and controls driving a motor has a drive circuit that drives the motor, a power supply circuit that is disposed between the primary power supply and the drive circuit, and uses electrical energy supplied from the primary power supply to supply a drive voltage to the drive circuit, and a power supply control circuit that controls operation of the power supply circuit. The power supply control circuit monitors the drive voltage, stops the power supply circuit and stops supplying the drive voltage when the drive voltage is greater than or equal to a prescribed constant voltage, and activates the power supply circuit and supplies the drive voltage when the drive voltage is less than the prescribed constant voltage.

13 Claims, 11 Drawing Sheets

MOTOR DRIVE CONTROL CIRCUIT, SEMICONDUCTOR DEVICE, ELECTRONIC TIMEPIECE, AND ELECTRONIC TIMEPIECE WITH A POWER GENERATING DEVICE

CROSS-REFERENCE TO RELATED APPLICATIONS

Japanese Patent application No. 2007-102862 is hereby incorporated by reference in its entirety.

BACKGROUND

1. Field of Invention

The present invention relates to a motor drive control circuit, a semiconductor device, an electronic timepiece, and an electronic timepiece with a power generator.

2. Description of Related Art

Stepping motors and other types of motors are widely used as actuators in various different types of devices. In electronic timepieces, for example, a motor is used as an actuator to drive the hands.

Such motors have an operating voltage range, and the motor drive voltage is preferably kept constant within this operating voltage range, that is, the motor drive voltage is preferably a constant voltage, in order to drive the motor stably.

Primary batteries, such as silver oxide batteries that are conventionally used as the motor drive power source, provide a constant output voltage and can therefore easily supply a constant voltage as the motor drive voltage.

In order to make replacing the battery unnecessary, more recent electronic timepieces commonly have a built-in power generator such as a self-winding generator driven by a rotary pendulum or a solar generator, and a secondary battery that is charged by the current produced by the generator, and use the secondary battery as the primary power source of the motor.

However, because charging causes the voltage of the secondary battery to rise, the battery voltage may exceed the operating voltage of the motor.

To solve this problem, Japanese Unexamined Patent Appl. Pub. JP-A-H10-174494 teaches a motor drive control method for holding the motor drive voltage within the operating voltage range of the motor even when the secondary battery voltage rises by providing a voltage step-down circuit having three step-down capacitors and one smoothing capacitor in the power supply unit that controls the motor drive voltage, and supplying a voltage that is stepped down from the secondary battery voltage to the motor drive circuit.

Japanese Unexamined Patent Appl. Pub. JP-A-H07-306274 also teaches a drive control method that stabilizes motor drive by using an overcharge prevention mechanism (limiter) to suppress the voltage rise in the secondary battery caused by charging so that the motor drive voltage does not exceed a set constant voltage level.

There are two problems with the motor drive control method taught in Japanese Unexamined Patent Appl. Pub. JP-A-H10-174494.

First, because the step-down circuit reduces the secondary battery voltage by a specific multiple, the step-down voltage of the power supply unit also rises when the secondary battery voltage rises due to charging, and the motor drive voltage thus varies and does not remain constant.

More specifically, a large number of finely incremented step-down levels are required in order to maintain a constant step-down voltage as the secondary battery voltage rises analogically. However, setting numerous step-down levels requires numerous capacitors, which complicates the hardware circuit design.

Furthermore, if the step-down voltage is controlled using only two step-down ratios of 2/3 and 1/3 as taught in Japanese Unexamined Patent Appl. Pub. JP-A-H10-174494, the step-down voltage cannot be held constant as the secondary battery voltage rises on an analog curve.

Second, even if the step-down ratio from the state when the power supply unit supplies the battery voltage to the motor drive circuit is set to 2/3 based on the motor drive conditions so that the 2/3 step-down voltage is supplied to the motor drive circuit, it may not be possible to instantaneously step down the motor drive voltage because of the time constant of the smoothing capacitor in the power supply unit.

As a result, a delay that is at least as long as the time required for the motor drive voltage supplied form the power supply unit to go to the step-down voltage must be set in order to drive the motor stably. This means that the motor cannot be driven during this set delay period even when it is desirable to drive the motor immediately, and motor drive is thus delayed.

A problem with the method taught in Japanese Unexamined Patent Appl. Pub. JP-A-H07-306274 is that when the operating voltage range of the motor is relatively low, the limiter must operate in a low secondary battery voltage range and the duration time of the secondary battery is thus shortened. More specifically, because charging causes the voltage of the secondary battery to rise, the stored charge increases as the operating voltage of the limiter rises, and the duration time of the battery becomes longer. In other words, the voltage charge decreases and the duration time becomes shorter as the voltage at which the limiter operates decreases.

Therefore, if the limiter operates at a low voltage because the operating voltage range of the motor is low, the duration time is also shortened by a corresponding amount.

In order to balance stabilizing motor drive with increasing the duration time of the secondary battery, the operating voltage range of the motor must be increased so that the motor can be driven even when the secondary battery voltage is high.

However, increasing the operating voltage range of the motor normally imposes certain limits on motor performance. It is particularly difficult to achieve a wide operating voltage range in motors that operate at high speed in both forward and reverse rotation, and the motors that can be used for such applications are therefore limited.

Methods of preventing overcharging the secondary battery only while the motor is driven can also be used to stabilize motor drive, but this only stabilizes the motor drive voltage at the boosted secondary battery voltage, and ultimately requires increasing the operating voltage range of the motor. Furthermore, because the secondary battery cannot be charged while the motor is operating, charging efficiency drops.

SUMMARY OF INVENTION

A motor drive control circuit, a semiconductor device, and a timepiece according to a first aspect of the invention can quickly set the motor drive voltage to a prescribed constant voltage within the operating voltage range of the motor when the motor is driven, and can supply a motor drive voltage that does not depend on the main power supply voltage to the motor drive circuit to reliably drive the motor.

A motor drive control circuit, a semiconductor device, and an electronic timepiece with a power generating device according to a second aspect of the invention have a power generator and a secondary power supply, can quickly set the motor drive voltage to a prescribed constant voltage within the operating voltage range of the motor when the motor is driven while increasing the duration time without interfering with charging the secondary power supply when the secondary power supply is used as the main power supply to drive a motor, and can supply a motor drive voltage that does not depend on the voltage rise resulting from charging the secondary power supply to the motor drive circuit to reliably drive the motor.

A motor drive control circuit according to a first aspect of the invention that operates using a primary power supply and controls driving a motor has: a drive circuit that drives the motor; a power supply circuit that is disposed between the primary power supply and the drive circuit, and uses electrical energy supplied from the primary power supply to supply a drive voltage to the drive circuit; and a power supply control circuit that controls operation of the power supply circuit. The power supply control circuit monitors the drive voltage, stops the power supply circuit and stops supplying the drive voltage when the drive voltage is greater than or equal to a prescribed constant voltage, and activates the power supply circuit and supplies the drive voltage when the drive voltage is less than the prescribed constant voltage.

In this aspect of the invention the power supply control circuit monitors the drive voltage, and, if the drive voltage is greater than or equal to a prescribed constant voltage, stops (turns off) the power supply circuit to stop supplying the drive voltage from the power supply circuit. As a result, the load current causes the drive voltage to drop.

When the power supply circuit is off and the drive voltage goes below the prescribed constant voltage, the power supply control circuit activates (turns on) the power supply circuit to supply electrical energy from the primary power supply to the drive circuit, thereby boosting the motor drive voltage to the prescribed constant voltage.

If the drive voltage again rises above the prescribed constant voltage, the power supply control circuit can turn the power supply circuit off again to return the motor drive voltage to the prescribed constant voltage. By thus repeatedly applying this on/off control of the power supply circuit based on the detected drive voltage, the motor drive voltage can be held to a substantially constant voltage.

A motor drive voltage that does not depend on the primary power supply voltage can therefore be supplied to the motor drive circuit, and the motor drive control circuit of the invention can reliably and stably drive the motor.

Preferably, the motor drive control circuit also has a discharge unit for discharging electrical energy stored in a storage device that stores electrical energy supplied from the power supply circuit, and the power supply control circuit activates the discharge unit to lower the storage device voltage to the prescribed constant voltage when the storage device voltage is greater than or equal to the prescribed constant voltage.

The storage device is rendered using a capacitor, for example, and can be incorporated into the motor drive control circuit or disposed externally to the motor drive control circuit.

When the power supply circuit is on and the drive voltage is supplied, the electrical energy is stored in the storage device rendered by a capacitor, for example. As a result, the drive voltage of the drive circuit can be supplied from the storage device even when the power supply circuit is off. By thus providing a capacitor or other storage device, a sudden drop in the motor drive voltage can be prevented even when current consumption is high when the motor is driven, the motor drive voltage can be held at a prescribed constant voltage, and the motor can be driven reliably and stably.

Furthermore, because the discharge unit is activated to lower the voltage of the storage device to the prescribed constant voltage when the voltage of the storage device exceeds the prescribed constant voltage, the motor drive voltage can be quickly set to the prescribed constant voltage even when a storage device is provided, and a delay in motor drive can be prevented.

Yet further preferably, the discharge unit discharges electrical energy in the storage device using the motor drive circuit.

The discharge unit can be rendered using dedicated discharge components such as resistors and constant current devices. However, by using the motor drive circuit as the discharge unit as in this aspect of the invention, the need for dedicated discharge components can be eliminated, the circuit design is correspondingly simplified, and the size of the motor drive control circuit can be reduced.

Yet further preferably, the power supply control circuit can select a primary power supply drive mode that drives the drive circuit at the primary power supply voltage, and a constant voltage drive mode that drives the drive circuit at the prescribed constant voltage. When the primary power supply drive mode is selected, the power supply control circuit activates the power supply circuit to supply electrical energy from the primary power supply to drive the drive circuit. When the constant voltage drive mode is selected, the power supply control circuit monitors the drive voltage, stops the power supply circuit and stops supplying the drive voltage when the drive voltage is greater than or equal to a prescribed constant voltage, and activates the power supply circuit and supplies the drive voltage when the drive voltage is less than the prescribed constant voltage.

When the primary power supply drive mode is selected in this aspect of the invention, the power supply control circuit supplies electrical energy from the primary power supply through the power supply circuit to the motor drive circuit, and drives the motor drive circuit at the voltage of the primary power supply. If the primary power supply voltage fluctuates at this time the drive voltage of the motor also fluctuates, but voltage control is not required and power consumption is thus reduced.

When the constant voltage drive is selected, the power supply control circuit monitors the drive voltage, stops (turns off) the power supply circuit if the drive voltage is greater than or equal to the prescribed constant voltage, and activates (turns on) the power supply circuit if the drive voltage is less than the prescribed constant voltage. By thus repeatedly applying this on/off control of the power supply circuit based on the detected drive voltage, the motor drive voltage can be held to a substantially constant voltage, and the motor can be driven stably and reliably.

Furthermore, by providing two drive modes, the appropriate voltage can be applied to each motor when there are motors with different operating voltage ranges, and each motor can be driven efficiently. For example, if there is a motor with a narrow operating range and a motor with a wide operating range, the motor drive voltage is preferably the primary power supply voltage, which is higher than the constant voltage, when the motor with the relatively wide operating range is used to drive a heavy load such as the hands indicating the time in a timepiece. However, when the motor with the narrow operating range is driven, the motor drive voltage is preferably the constant voltage.

Therefore, by enabling selectively using two drive modes, the primary power supply drive mode can be selected to drive the motor with a wide operating voltage range at the primary power supply voltage, the constant voltage drive mode can be selected when driving the motor with the narrow operating voltage range at the constant voltage, and motors with different characteristics can be driven efficiently.

In another aspect of the invention the power supply circuit has a field effect transistor of which the drain or the source is connected directly or indirectly to the primary power supply, and the other of the drain and the source is connected to the power supply line of the drive circuit; and the power supply control circuit monitors the drive voltage, stops supplying electrical energy from the primary power supply to the drive circuit by controlling signal input to the gate of the field effect transistor to turn the field effect transistor off when the drive voltage is greater than or equal to the prescribed constant voltage, and supplies electrical energy from the primary power supply to the drive circuit by controlling signal input to the gate of the field effect transistor to turn the field effect transistor on when the drive voltage is less than the prescribed constant voltage.

If the power supply circuit includes a field effect transistor, the power supply circuit can be switched on and off by applying a small gate current, and can be easily rendered in a semiconductor device (IC chip).

Note that connecting the drain or source of the field effect transistor directly to the primary power supply means that the drain or source of the field effect transistor is directly connected to the primary power supply, while an indirect connection means that the drain or source is connected indirectly through a charging control circuit, for example.

Yet further preferably, the field effect transistor has a parasitic diode, and the parasitic diode is disposed with the anode connected to the power supply line of the drive circuit, and the cathode connected to the primary power supply.

When the field effect transistor is off in this arrangement, the parasitic diode prevents the storage device from being charged by current from the primary power supply, and the motor drive voltage can be controlled to a stable constant voltage. More specifically, if the storage device is charged from the primary power supply even though the power supply circuit having the field effect transistor is off, the motor drive voltage will fluctuate and becomes difficult to control the constant voltage. However, the parasitic diode in this aspect of the invention prevents the storage device from being charged from the primary power supply when the field effect transistor is off, and thus enables stable constant voltage control.

Yet further preferably, the off leakage current of the field effect transistor is set to be less than the load current of the power supply circuit when the motor is not driven.

This aspect of the invention prevents the off leakage current from the primary power supply from charging the storage device when the field effect transistor is off, and thus enables stable constant voltage control of the motor drive voltage.

Yet further preferably, the threshold voltage of the field effect transistor is set low in the range satisfying the condition that the off leakage current of the field effect transistor is less than the load current of the power supply circuit when the motor is not driven.

This aspect of the invention assures the drive capacity of the field effect transistor while also enabling reducing the transistor size.

In another aspect of the invention a load other than the motor is connected to the output line of the power supply circuit so that the off leakage current of the field effect transistor is less than the load current of the power supply circuit when the motor is not driven.

This aspect of the invention prevents the off leakage current from the primary power supply from charging the storage device when the field effect transistor is off, and thus enables stable constant voltage control of the motor drive voltage.

In another aspect of the invention the power supply control circuit includes a comparator that compares a prescribed reference voltage with power supply circuit output; and the comparator constantly compares power supply circuit output with the reference voltage, and based on the result of the comparison controls activating and deactivating the power supply circuit.

This aspect of the invention constantly drives the comparator, can thereby detect change in the drive voltage in real time, can quickly apply voltage control when the drive voltage deviates from the prescribed constant voltage, and thus enables stable constant voltage control of the motor drive voltage.

Yet further preferably, the comparator includes a voltage divider that voltage divides the power supply circuit output in one or multiple levels.

By including a voltage divider that voltage divides the power supply circuit output, the comparison voltage that is compared with the reference voltage of the comparator can be adjusted by controlling the voltage division ratio of the voltage divider.

As a result, if the prescribed constant voltage differs according to the type of motor that is controlled by the motor drive control circuit, the constant voltage appropriate for the motor being controlled can be easily adjusted by appropriately setting the voltage division ratio of the voltage divider.

Furthermore, if the voltage divider is capable of voltage division in multiple levels, the constant voltage can be changed by simply selecting the appropriate voltage division level, and the constant voltage that is optimal for the motor application can be easily set. The constant voltage that is optimal for driving each motor can therefore be set when a plurality of motors is used, and each motor can be driven reliably and consistently.

Yet further preferably, a load other than the motor is connected to the output line of the power supply circuit so that the off leakage current of the field effect transistor is less than the load current of the power supply circuit when the motor is not driven; and the load is the voltage divider of the comparator.

This aspect of the invention prevents the off leakage current from the primary power supply from charging the storage device when the field effect transistor is off, and thus enables stable constant voltage control of the motor drive voltage.

The circuit size can also be reduced and a smaller motor drive control circuit can be achieved by thus using the voltage divider as the load.

A semiconductor device according to another aspect of the invention includes the motor drive control circuit of the invention.

The semiconductor device according to this aspect of the invention can quickly set the motor drive voltage to a prescribed constant voltage in the operating voltage range of the motor when driving the motor, can supply a motor drive voltage that does not depend on the primary power supply voltage to the motor drive circuit and thereby reliably drive the motor, and can achieve all other operational effects of the motor drive control circuits of the invention described above.

Furthermore, because the invention can be rendered in a semiconductor device (such as an IC chip), manufacturers of electronic devices having an internal motor can incorporate the semiconductor device of the invention to easily control driving the motor stably by setting the constant voltage according to the motor to be controlled.

The semiconductor device is preferably a microprocessor having a central processing unit.

This arrangement enables controlling the power supply control circuit and motor drive circuit by means of software, and thus enables easily implementing various types of control.

An electronic timepiece according to another aspect of the invention includes the motor drive control circuit according to the invention, and a motor that the motor drive control circuit controls driving.

By thus incorporating the motor drive control circuit of the invention, a motor drive voltage that does not depend on the primary power supply voltage can be supplied to the motor drive circuit, the motor drive voltage can be controlled to a constant voltage, and the motor can be driven reliably and consistently.

An electronic timepiece with a power generating device according to another aspect of the invention has a generating device; a primary power supply having a secondary power supply that is charged by power produced by the generating device; the motor drive control circuit according to the invention; and a motor that the motor drive control circuit controls driving.

By incorporating the motor drive control circuit of the invention, the motor drive voltage can be controlled to a constant voltage even if the voltage of the primary power supply that is charged by the generating device rises, and the motor can be driven reliably and consistently.

Preferably, the motor drive control circuit controls the motor drive voltage to a prescribed constant voltage parallel to electrical energy produced by the generating device being charged to the secondary power supply.

When the electrical energy produced by the generating device is charged to the secondary power supply, this aspect of the invention enables controlling the motor drive voltage to a constant voltage without interfering with the charging operation. The secondary power supply can therefore be charged efficiently, the duration time of the secondary power supply can be increased, and the motor can be driven reliably and consistently.

The secondary power supply can be a secondary battery, an electric double layer capacitor, an electrolytic capacitor, or other type of high capacitance capacitor.

The invention can thus quickly set the motor drive voltage to a prescribed constant voltage within the operating voltage range of the motor when the motor is driven, and can supply a motor drive voltage that does not depend on the main power supply voltage to the motor drive circuit to reliably drive the motor.

Furthermore, when there is a power generator and a secondary power supply and the secondary power supply is used as the main power supply to drive a motor, the invention can quickly set the motor drive voltage to a prescribed constant voltage within the operating voltage range of the motor when the motor is driven while increasing the duration time and not interfering with charging the secondary power supply, and can supply a motor drive voltage that does not depend on the voltage rise resulting from charging the secondary power supply to the motor drive circuit to reliably drive the motor.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Embodiment 1

A first embodiment of the invention is described next with reference to the accompanying figures.

General Arrangement of an Electronic Timepiece with a Power Generator

Figure 1:
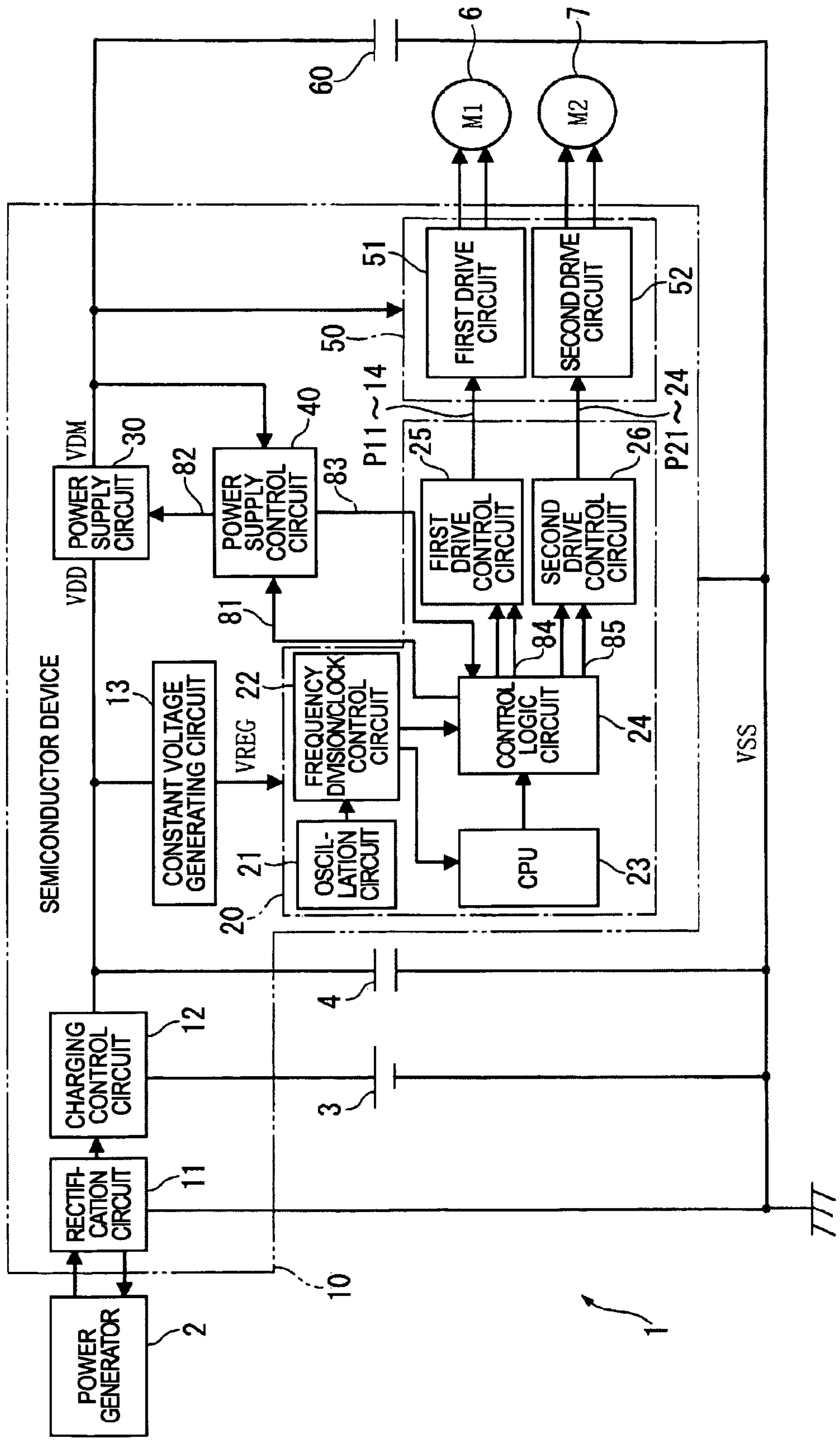
FIG. 1 is a block diagram showing the arrangement of an electronic timepiece with a power generator according to a preferred embodiment of the invention.

As shown in FIG. 1, an electronic timepiece with a power generator 1 according to this embodiment of the invention has a power generator 2, a secondary battery 3, a primary power supply storage capacitor 4, a first motor 6, a second motor 7, a semiconductor device (IC chip) 10, and a motor drive voltage storage capacitor 60. The motor drive voltage storage capacitor 60 is disposed externally to the semiconductor device 10 in this embodiment of the invention, but could be included in the semiconductor device 10.

The power generator 2 is any of various types of power generators that can be used in a timepiece, including, for example, a rotary power generator that produces kinetic energy by means of a rotary pendulum, for example, and uses this energy to drive a rotor and produce power, and a solar power generator that uses a solar panel to produce power by converting light energy to electrical power.

The secondary battery 3 is a storage device (secondary power supply) that can store the electrical energy produced by the power generator 2, and more specifically is a lithium ion battery or other type of known secondary battery.

The primary power supply storage capacitor 4 is used to assist the secondary battery 3, which is the primary power supply. More specifically, because the secondary battery 3 has a relatively large storage capacity and has internal resistance, there is a delay between when charging starts and when voltage sufficient to drive the semiconductor device 10 has been stored. However, while the storage capacity of the primary power supply storage capacitor 4 is smaller than the secondary battery 3, the primary power supply storage capacitor 4 can store enough voltage to drive the semiconductor device 10 soon after charging begins.

Providing both a secondary battery 3 and a primary power supply storage capacitor 4 thus enables rapidly boosting the power supply voltage when charging starts to assure the starting performance of the semiconductor device 10 while also assuring the large power supply capacity required to increase the duration time that the semiconductor device 10 can be driven.

The motors 6 and 7 are preferably stepping motors. What is driven by the motors 6 and 7 is determined by the type of electronic timepiece 1.

The first motor 6 could drive the hour hand and minute hand of the electronic timepiece 1 while the second motor 7 drives the second hand, for example. Alternatively, the first motor 6 could drive the hour hand, the minute hand, and the second hand while the second motor 7 drives a date wheel or a hand that indicates some other type of information.

Semiconductor Device

The semiconductor device 10 (a semiconductor chip or IC device) includes a rectification circuit 11, a charging control circuit 12, a constant voltage generating circuit 13, a constant voltage drive unit 20, a power supply circuit 30, a power supply control circuit 40, and a drive circuit 50.

The constant voltage drive unit 20 includes an oscillation circuit 21, a frequency division/clock control circuit 22, a CPU 23, a control logic circuit 24, a first drive control circuit 25, and a second drive control circuit 26.

The rectification circuit 11 rectifies the AC current output from the power generator 2, and could be a full-wave rectification circuit, half-wave rectification circuit, or other type of known rectification circuit.

The charging control circuit 12 controls charging the current rectified by the rectification circuit 11 to the secondary battery 3 and primary power supply storage capacitor 4. The charging control circuit 12 includes a quick-start circuit and a step-up/step-down circuit that steps the secondary battery 3 voltage up and down. The quick-start circuit adds a prescribed voltage to the secondary battery 3 voltage to increase the apparent voltage and drive the semiconductor device 10 even when the secondary battery 3 voltage is low.

The constant voltage generating circuit 13 operates at the primary power supply voltage VDD, and generates and supplies a constant voltage VREG that is lower than the power supply voltage VDD to the constant voltage drive unit 20. The oscillation circuit 21, the frequency division/clock control circuit 22, the CPU 23, the control logic circuit 24, the first drive control circuit 25, and the second drive control circuit 26 therefore operate at the constant voltage VREG. The circuits of the constant voltage drive unit 20 operate at a constant voltage VREG that is lower than the primary power supply voltage VDD in order to reduce the current consumption of each circuit.

The oscillation circuit 21 has a crystal oscillator and outputs a signal of a prescribed frequency.

The frequency division/clock control circuit 22 frequency divides the signal from the oscillation circuit 21, and outputs reference signals derived by frequency division to the CPU 23 and the control logic circuit 24.

The CPU 23 and the control logic circuit 24 operate at a supplied clock. The control logic circuit 24 processes software commands from the CPU 23, and outputs the results to the power supply control circuit 40 and the drive control circuits 25 and 26.

Based on the process results supplied from the control logic circuit 24, the drive control circuits 25 and 26 produce motor drive pulses and movement timing signals according to the forward, reverse, movement period, and other drive modes, and supply the motor drive pulses to the first drive circuit 51 and second drive circuit 52 of the drive circuit unit 50.

The power supply control circuit 40 operates at the Enable signal 81 output by the control logic circuit 24 processing software commands from the CPU 23. More specifically, the power supply control circuit 40 monitors the motor drive voltage VDM on the output side of the power supply circuit 30, and based on the monitored result outputs an on/off control signal 82 to the power supply circuit 30 to control operation of the power supply circuit 30.

The on/off state of the power supply circuit 30 is controlled by the on/off control signal 82 from the power supply control circuit 40, and outputs electrical energy from the primary power supply as the motor drive voltage VDM when on. When on the power supply circuit 30 also charges the motor drive voltage storage capacitor 60 to the motor drive voltage VDM level. The motor drive voltage storage capacitor 60 is provided to prevent a sudden drop in the motor drive voltage caused by the large current flow when the motor is driven.

When the power supply circuit 30 is off, the supply of electrical energy from the primary power supply is interrupted. The electrical energy stored in the motor drive voltage storage capacitor 60 is therefore output as the motor drive voltage VDM to drive the drive circuit 50.

If the drive circuit 50 is driven when the power supply circuit 30 is off, the motor drive voltage VDM drops. The power supply control circuit 40 therefore turns the power supply circuit 30 on when the motor drive voltage VDM drops to or below a prescribed constant voltage so that electrical energy from the primary power supply is again output as the motor drive voltage VDM and the motor drive voltage VDM is held constant.

The first drive circuit 51 and second drive circuit 52 of the drive circuit 50 operate at the motor drive voltage VDM output from the power supply circuit 30. The drive circuits 51 and 52 then apply a motor control signal at the motor drive voltage VDM level to the respective motor coils according to the motor drive pulses output from the drive control circuits 25 and 26, and drive the first motor 6 and the second motor 7 at the motor drive voltage VDM.

Power Supply Control Circuit

Figure 2:
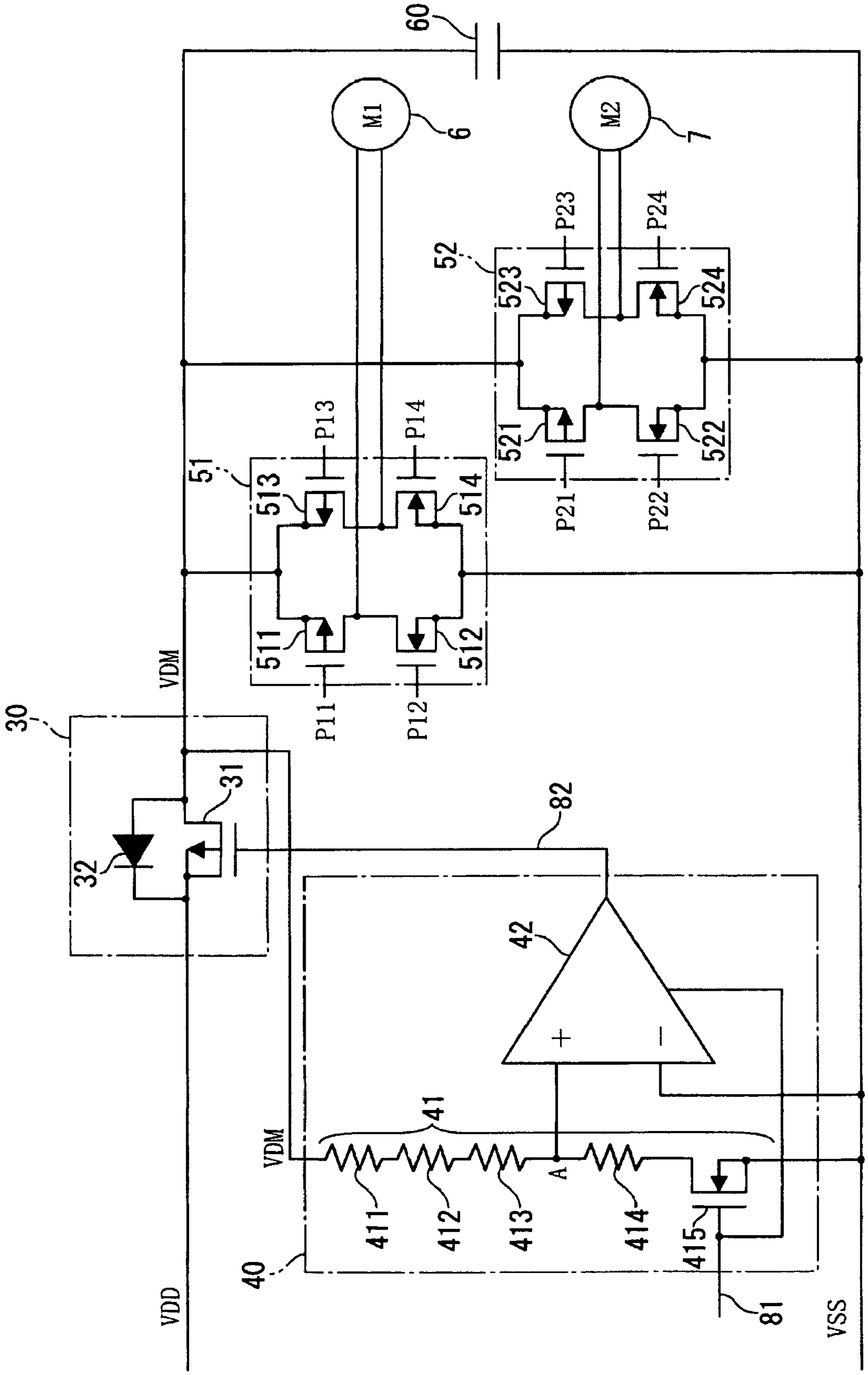
FIG. 2 is a circuit diagram of the main part of a semiconductor device in the preferred embodiment of the invention.

As shown in FIG. 2, the power supply control circuit 40 has a voltage divider 41 and a comparator 42, and is activated when the Enable signal 81 output from the control logic circuit 24 goes high.

The comparator 42 produces a reference voltage at a prescribed work function difference. As a result, if the negative (−) node of the comparator 42 is connected to VSS (0 V), the reference voltage equals the work function difference. In this embodiment of the invention the reference voltage=work function difference=1 V.

The voltage divider 41 has resistances 411, 412, 413, and 414, and a field effect transistor 415 that is used as a switch. When the field effect transistor 415 is turned on by the Enable signal 81, the output voltage VDM of the power supply circuit 30 is voltage divided at a prescribed voltage division ratio (which is set by the resistance of the resistances 411 to 414), and the voltage division result at node A is input to the positive (+) node of the comparator 42.

The voltage division ratio of the voltage divider 41 is set so that if the motor drive voltage is to be a prescribed constant voltage of 1.35 V, for example, node A goes to the reference voltage of the comparator, which is 1 V in this example, when VDM=1.35 V.

In this case, the output of the comparator 42 that becomes the on/off control signal 82 goes to the undetected state (output low) when voltage VDM<1.35 V, and goes to the detected state (output high) when voltage VDM≧1.35 V.

Power Supply Circuit

The power supply circuit 30 has a p-type field effect transistor 31.

If the motor drive voltage VDM output from the power supply circuit 30 is less than 1.35 V, the on/off control signal 82 from the comparator 42 goes low, the field effect transistor 31 goes on, and the primary power supply voltage VDD goes to motor drive voltage VDM.

When the field effect transistor 31 goes on, the motor drive voltage storage capacitor 60 is charged by the electrical energy output from the power supply circuit 30, and the voltage of the motor drive voltage storage capacitor 60 also goes to the motor drive voltage VDM.

If the field effect transistor 31 is on and the motor drive voltage VDM is greater than or equal to 1.35 V, the on/off control signal 82 from the comparator 42 goes high, the field effect transistor 31 goes off, and charging the motor drive voltage storage capacitor 60 stops.

By switching the on/off state of the field effect transistor 31 at the detection speed of the comparator 42, the output of the power supply circuit 30 is held to a substantially constant voltage of 1.35 V.

Figure 3:
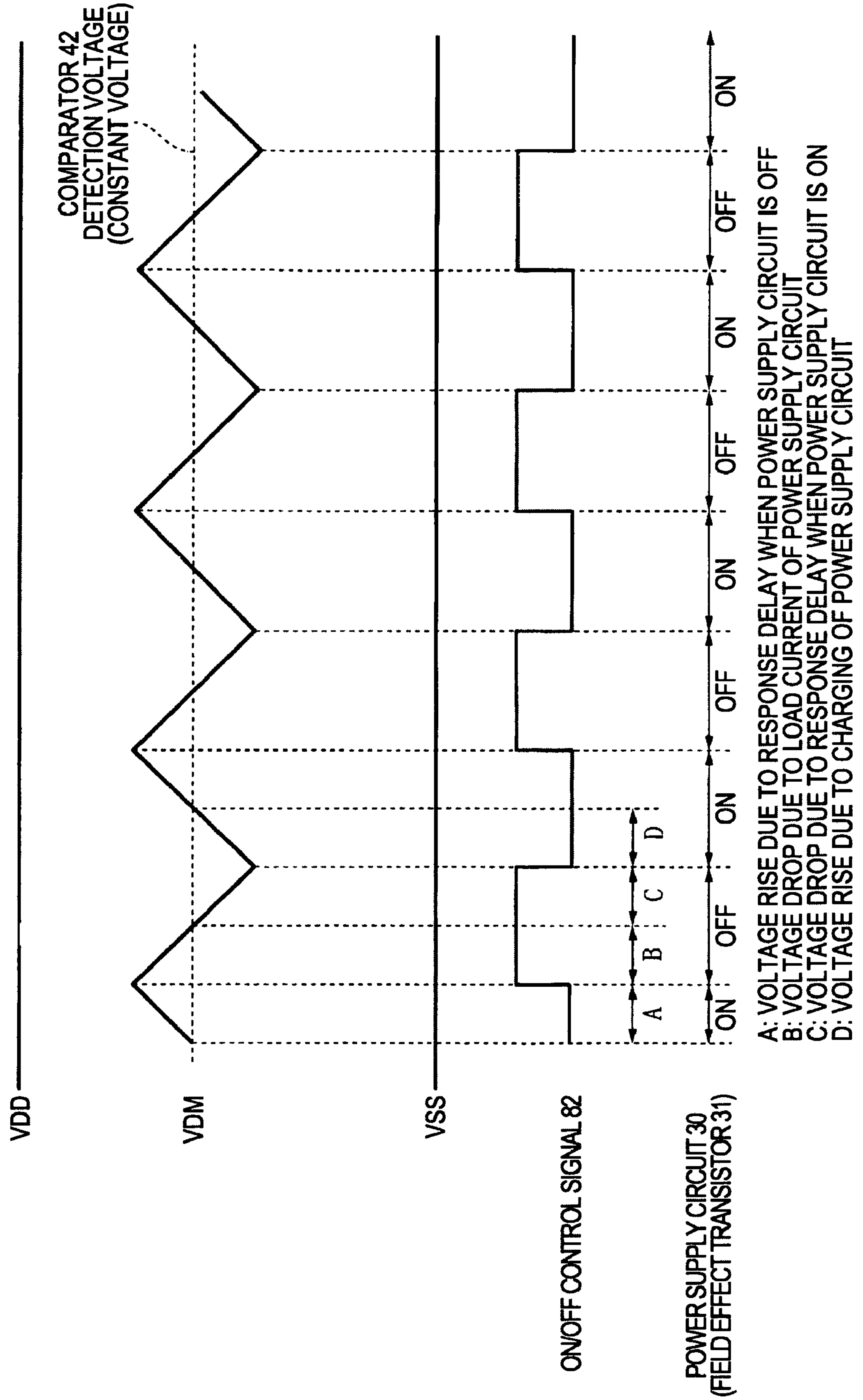
FIG. 3 is a timing chart of voltage fluctuation when the power supply circuit response is slow.

In order to increase the on/off response speed of the field effect transistor 31, the parasitic capacitance of the gate node must be reduced. More specifically, if the response of the field effect transistor 31 is slow, the output voltage VDM of the power supply circuit 30 will have a triangular waveform as shown in FIG. 3 and will not be a constant voltage. More particularly, the voltage continues to rise as shown in period A in FIG. 3 because the field effect transistor 31 does not turn off immediately when the output voltage VDM goes to or above the detection voltage (constant voltage) of the comparator 42. In addition, because the field effect transistor 31 does not turn on immediately when the field effect transistor 31 is off, the load current causes the voltage to drop, and the output voltage VDM goes below the detection voltage of the comparator 42, the voltage continues to drop during period C as shown in FIG. 3. As a result, the output voltage VDM of the power supply circuit 30 fluctuates in a triangular wave pattern.

The response of the field effect transistor 31 must therefore be increased to prevent this from happening, and this requires making the field effect transistor 31 smaller and reducing the parasitic capacitance of the gate node.

Furthermore, to reduce motor drive voltage VDM loss, the drive capacity must be increased. This requires increasing the size of the field effect transistor 31.

To balance these opposing needs and achieve the required performance, the size of the field effect transistor 31 must be reduced to reduce the parasitic capacitance of the gate node, and the threshold voltage must be set low to increase the drive capacity.

On the other hand, if the threshold voltage of the field effect transistor 31 is set low, the off leakage current of the field effect transistor 31 increases. If the off leakage current increases and the off leakage current becomes greater than the load current of the power supply circuit 30, the motor drive voltage storage capacitor 60 will be charged by the off leakage current even when the field effect transistor 31 is off and the power supply circuit 30 will not output a constant voltage.

To avoid this, a voltage divider 41 is connected to the load of the power supply circuit 30 so that the off leakage current is less than the load current of the power supply circuit 30.

The field effect transistor 31 has a parasitic diode 32, and the parasitic diode 32 substrate is connected to the primary power supply voltage VDD so that the anode is connected to the power supply line on the motor drive voltage VDM side and the cathode is connected to the power supply line on the primary power supply voltage VDD side.

This arrangement prevents the motor drive voltage storage capacitor 60 from being charged by the forward current of the parasitic diode 32 when the field effect transistor 31 is off and charging the motor drive voltage storage capacitor 60 is interrupted.

By using a field effect transistor 31 with a fast response speed as described above, the on/off control signal 82 causes the field effect transistor 31, or more particularly the power supply circuit 30, to switch on/off immediately when the motor drive voltage VDM deviates from the detection voltage, or more particularly the constant voltage, of the comparator 42, and the motor drive voltage VDM is thus held to a substantially constant voltage. As described above, the power supply circuit 30 is off when the on/off control signal 82 is high and on when the on/off control signal 82 is low.

Drive Circuit

As shown in FIG. 2 the first drive circuit 51 has four field effect transistors 511, 512, 513, and 514. The field effect transistors 511, 512, 513, and 514 are independently switched on and off by the motor drive pulses P11 to P14 output from the first drive control circuit 25.

Transistors 511 and 512 are connected in series, transistors 513 and 514 are connected in series, and transistor pair 511, 512 and transistor pair 513, 514 are parallel connected.

The coil of the first motor 6 is connected to a node between transistors 511 and 512 and to a node between transistors 513 and 514.

As shown in FIG. 2, the second drive circuit 52 is configured identically to the first drive circuit 51, and has four field effect transistors 521, 522, 523, 524. The field effect transistors 521, 522, 523, and 524 are independently switched on and off by the motor drive pulses P21 to P24 output from the second drive control circuit 26.

The connections of the transistors 521 to 524 and the connection of the coil of the second motor 7 are the same as in first drive circuit 51, and further description thereof is omitted.

Motor Drive Control Process

In this embodiment of the invention the motors 6 and 7 can be selectively driven in a primary power supply drive mode driven by the primary power supply voltage VDD, or a constant voltage drive mode driven at a constant voltage. This drive mode selection is based on the type and the operating state of the controlled motor 6, 7. The user can manually select the drive mode, or the drive mode can be automatically selected by the CPU 23.

Primary Power Supply Drive Mode: Power Supply Circuit On

When the motor 6, 7 is driven at the primary power supply voltage VDD, the Enable signal 81 output from the control logic circuit 24 to the power supply control circuit 40 is low. This causes the voltage divider 41 to go off, the comparator 42 to be disabled, and the on/off control signal 82 output from the power supply control circuit 40 to the power supply circuit 30 to go low.

Figure 5:
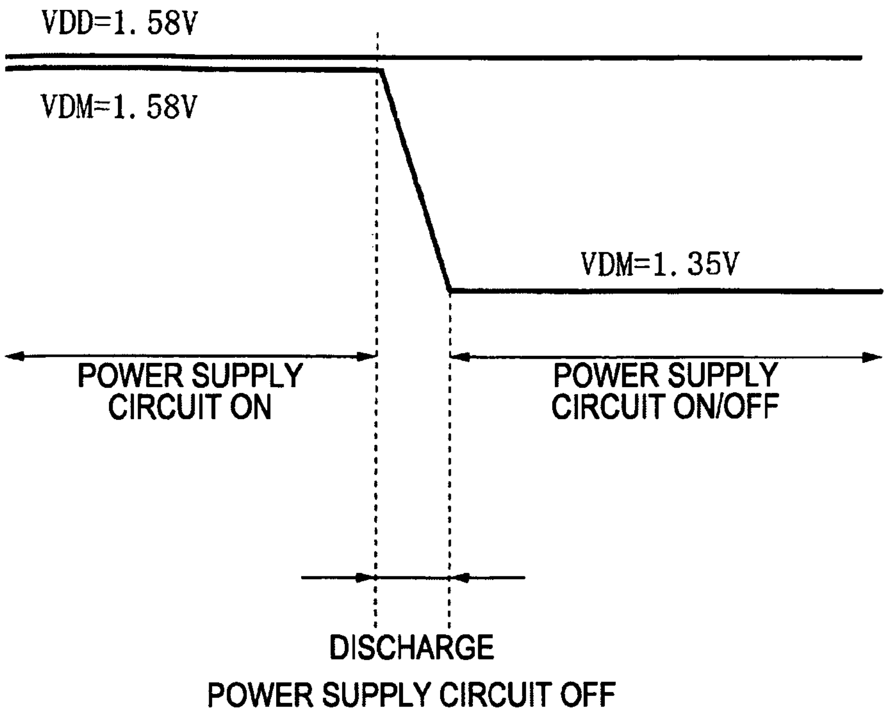
FIG. 5 shows the variation and control state of the motor drive voltage in the preferred embodiment of the invention.

As a result, the field effect transistor 31 turns on and the power supply circuit 30 is on. The motor drive voltage storage capacitor 60 is thus connected to the secondary battery 3 and is charged to the primary power supply voltage VDD level. The motor drive voltage VDM equals the primary power supply voltage VDD at this time, and if VDD=1.58 V as shown in FIG. 5 for example, VDM=1.58 V.

Constant Voltage Drive Mode

If the constant voltage drive mode is selected, discharge control is applied (the power supply circuit is turned off) so that the motor drive voltage VDM drops rapidly from the primary power supply voltage VDD to the prescribed constant voltage. After lowering the motor drive voltage VDM to the constant voltage, the power supply circuit 30 is switched on and off as described above to hold the motor drive voltage VDM at the prescribed constant voltage.

Discharge Control: Power Supply Circuit Off

When the constant voltage drive mode is selected, the CPU 23 instructs the control logic circuit 24 to execute discharge control using the first drive circuit 51. The control logic circuit 24 then outputs a discharge start signal 84, the first drive control circuit 25 outputs a discharge motor drive pulse, and a discharge current flows using the first drive circuit 51 as a discharge circuit.

More specifically, the CPU 23 outputs a software command causing the control logic circuit 24 to output the Enable signal 81 and activate the power supply control circuit 40.

The power supply control circuit 40 detects if the voltage VDM is greater than or equal to the constant voltage (1.35 V in this embodiment of the invention) used for constant voltage drive of the motor 6, 7 by means of the comparator 42. For example, if voltage VDD=1.58 V as described above, the comparator 42 determines that voltage VDM is greater than or equal to 1.35 V, outputs a high on/off control signal 82, and turns the power supply circuit 30 off.

The field effect transistor 31 therefore turns off, and charging the motor drive voltage storage capacitor 60 from the primary power supply is interrupted.

The CPU 23 then causes the control logic circuit 24 to output the discharge start signal 84, and causes the first drive control circuit 25 to output the motor drive pulses P11 to P14 for using the first drive circuit 51 as a discharge circuit.

More specifically, in response to the command from the control logic circuit 24 that executes processes according to software commands from the CPU 23, the first drive control circuit 25 outputs motor drive pulse P11 low, outputs pulse P12 high, outputs pulse P13 high, and outputs pulse P14 low.

Figure 6:
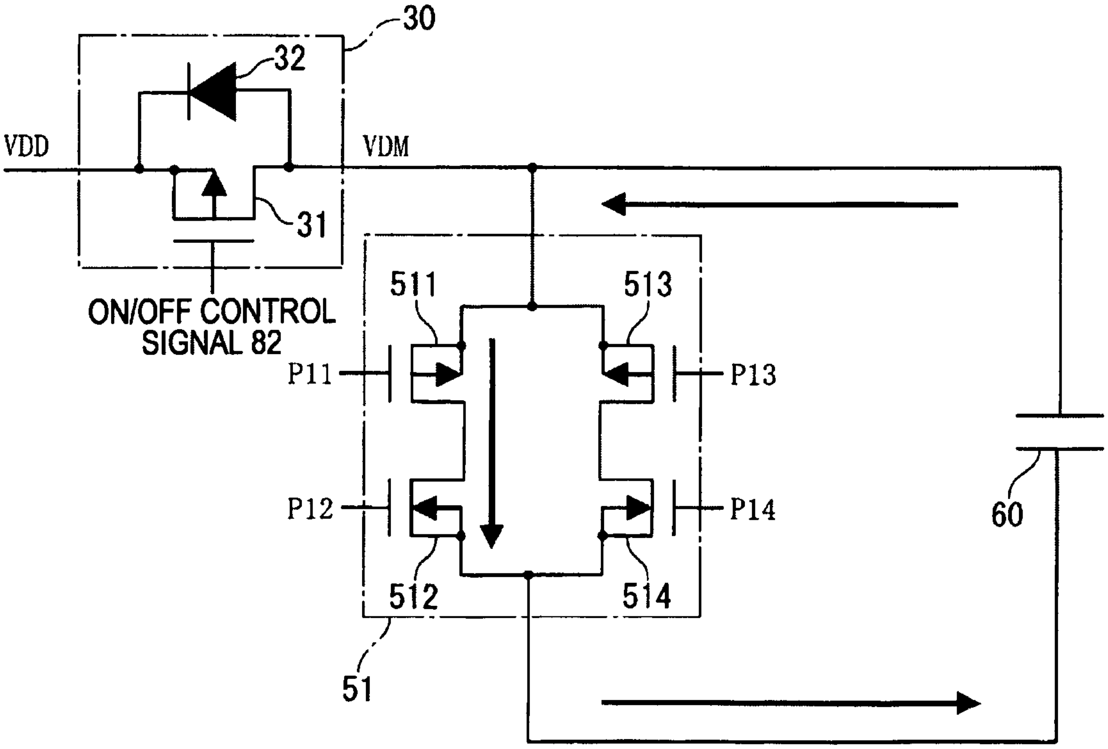
FIG. 6 is a circuit diagram of the discharge unit in the preferred embodiment of the invention.

These motor drive pulses P11 to P14 set the four field effect transistors 511, 512, 513, and 514 of the first drive circuit 51 so that transistor 511 is on, transistor 512 is on, transistor 513 is off, and transistor 514 is off. As a result, the discharge current flows from the motor drive voltage storage capacitor 60 through field effect transistors 511 and 512 as shown in FIG. 6, and the motor drive voltage storage capacitor 60 is discharged to the constant voltage (1.35 V) as shown in FIG. 5.

The discharge current is on the order of several mA and the discharge time is on the microsecond order, and discharging can therefore be easily processed between the steps the second hand is moved at a one second interval. As a result, driving the motors 6, 7 is prohibited during this discharge period.

While the motor drive voltage storage capacitor 60 is discharging, the power supply control circuit 40 detects if the voltage VDM has dropped below the constant voltage (1.35 V) by means of the comparator 42. When voltage VDM goes below the constant voltage, the power supply control circuit 40 outputs a discharge stop signal 83 to the control logic circuit 24 as shown in FIG. 1, and the control logic circuit 24 stops discharge control of the first drive circuit 51 by means of the first drive control circuit 25.

While the motor drive voltage storage capacitor 60 may return to the same voltage after discharging ends depending on the capacity and type of the storage capacitor, repeating the above-described discharge cycle can reliably discharge the stored voltage to the prescribed constant voltage level.

Power Supply Circuit On/Off Control

After the motor drive voltage storage capacitor 60 is discharged to the constant voltage, the motor drive voltage VDM is held at the constant voltage by switching the field effect transistor 31 on/off by means of the on/off control signal 82 output from the power supply control circuit 40.

Figure 4:
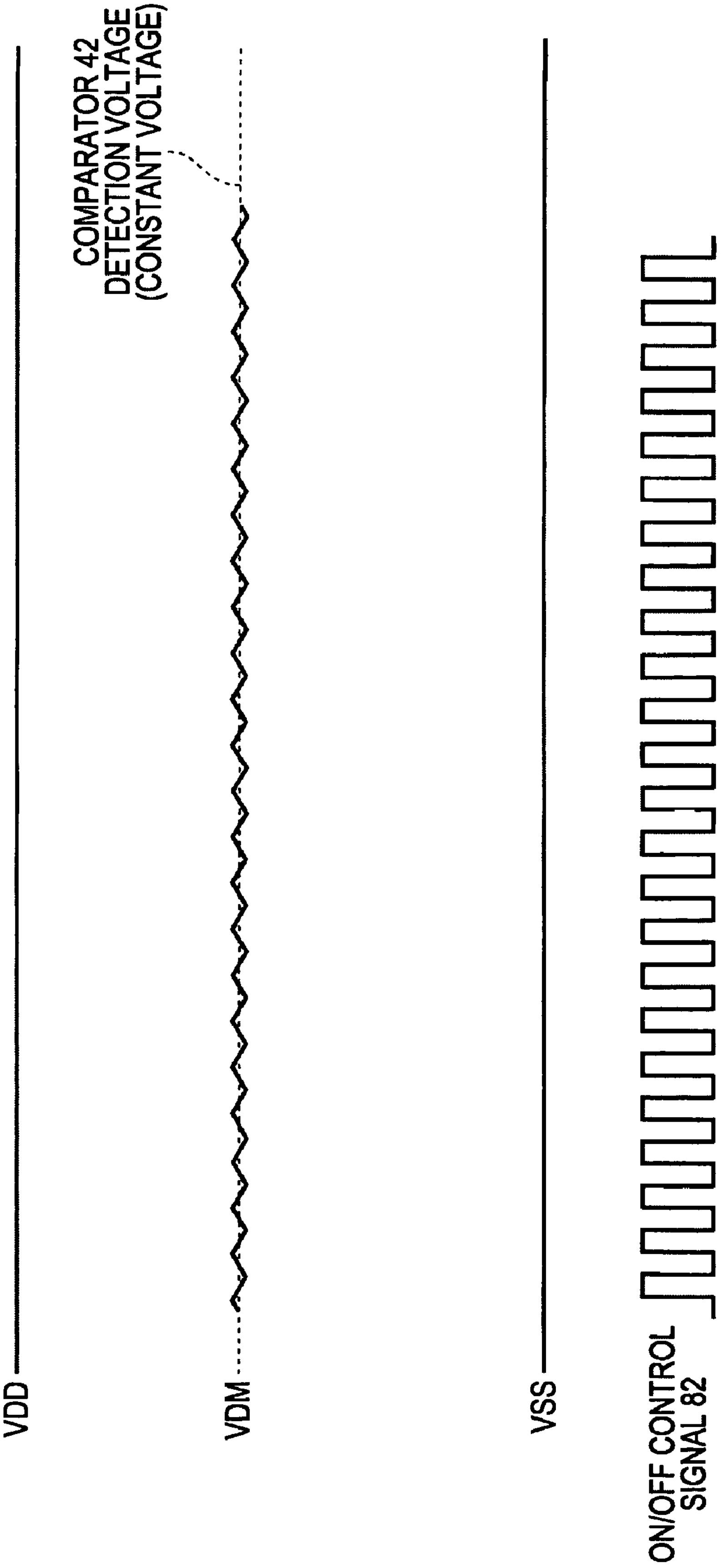
FIG. 4 is a timing chart of voltage fluctuation when the power supply circuit response is fast.

More specifically, as shown in FIG. 4, by repeatedly turning the field effect transistor 31 on when the motor drive voltage VDM is greater than or equal to the constant voltage, and turning the field effect transistor 31 off when the motor drive voltage VDM is less than the constant voltage level, the voltage VDM can be held substantially constant. As a result, the motors 6, 7 can be driven reliably and consistently by the constant voltage.

This embodiment describes using the first drive circuit 51 as the discharge circuit, but the second drive circuit 52 could be used as the discharge circuit. In this case the control logic circuit 24 outputs a discharge start signal 85 that sets the second drive circuit 52 as the discharge circuit to the second drive control circuit 26, and the second drive control circuit 26 outputs the motor drive pulses P21 to P24 to use the second drive circuit 52 as the discharge circuit for discharging the capacitor in the same way as the first drive control circuit 25 and the first drive circuit 51 are controlled as described above.

This embodiment of the invention has the following effects.

(1) By providing a power supply circuit 30 and a power supply control circuit 40, a primary power supply drive mode that sets the motor drive voltage VDM to the primary power supply voltage VDD, and a constant voltage drive mode that holds the motor drive voltage VDM to a constant voltage, can be selected and controlled.

More specifically, because the on/off control signal 82 goes low and the field effect transistor 31 of the power supply circuit 30 remains on when the power supply control circuit 40 is disabled, operation can be controlled in the primary power supply drive mode in which the motor drive voltage VDM equals the primary power supply voltage VDD.

However, if the power supply control circuit 40 is enabled, the comparator 42 compares the motor drive voltage VDM with the constant voltage and the on/off state of the field effect transistor 31 is controlled according to the result so that the motor drive voltage VDM can be held to the constant voltage.

The motor drive voltage VDM can therefore be easily held to the constant voltage using only the power supply control circuit 40, the motor 6, 7 can be driven at a constant voltage in the operating voltage range, and the motor 6, 7 can be driven reliably and stably.

(2) Because the power supply control circuit 40 compares the actual motor drive voltage VDM with a constant voltage to switch the power supply circuit 30 on/off, the motor drive voltage VDM can be reliably held to the constant voltage even if the primary power supply voltage VDD fluctuates due to charging the secondary battery 3, for example, without being affected by variations in the primary power supply voltage VDD as conventionally happens when a step-down circuit that steps the primary power supply voltage VDD down to 2/3 or 1/3, for example, is used.

Furthermore, because constant voltage drive control of the motor 6, 7 is possible without being affected by the primary power supply voltage, the power generator 2 can continue charging the secondary battery 3 while the motor 6, 7 is being driven, and charging efficiency can thus be improved.

(3) By providing a discharge unit that discharges electrical energy from the motor drive voltage storage capacitor 60, the motor drive voltage VDM can be rapidly lowered to the constant voltage, and a delay in motor drive can be prevented.

More specifically, a standby time determined by the time constant must be set and motor drive is thus delayed by the technology of the related art because of the time that is required for the motor drive voltage VDM to drop to the constant voltage due to the time constant of the step-down circuit.

However, this embodiment of the invention has a discharge unit for discharging electrical energy stored in the motor drive voltage storage capacitor 60, can therefore quickly lower the motor drive voltage VDM to the constant voltage, and can thus prevent a delay in motor drive.

(4) By providing a motor drive voltage storage capacitor 60, this embodiment prevents the motor drive voltage from dropping sharply when current output rises to drive the motor, the motor drive voltage can be held to a prescribed constant voltage, and the motor can be driven reliably and stably.

(5) By controlling the operation of the field effect transistors 511, 512, 513, and 514 by means of motor drive pulses P11 to P14, and using the first drive circuit 51 as a discharge circuit, the arrangement of the motor drive control circuit can be simplified, the circuit size can be reduced, and a smaller semiconductor device 10 can be achieved compared with an arrangement that uses dedicated discharge devices such as resistors and constant current devices to discharge electrical energy.

(6) By rendering the power supply circuit 30 using a field effect transistor 31, the power supply circuit 30 can be switched on and off using a small gate current and can be easily incorporated in a semiconductor device 10.

Furthermore, by providing a parasitic diode 32 that prevents the motor drive voltage storage capacitor 60 from being charged from the primary power supply when the field effect transistor 31 is off, the motor drive voltage VDM can be prevented from rising while charging and stable constant voltage control can be achieved when the field effect transistor 31 is turned off to lower the motor drive voltage VDM.

(7) Because the power supply control circuit 40 is rendered with a voltage divider 41 and comparator 42, deviation in the temperature characteristic of the detection voltage of the comparator 42 during mass production of the IC devices can be minimized. More specifically, the threshold voltage of the transistor rendering the comparator 42 changes in the same direction, and there is no change in the work function difference (=threshold voltage difference) that is the reference voltage of the comparator 42.

Furthermore, because the voltage division result acquired from node A of the voltage divider 41 and the resistances of the voltage divider 41 also change in the same direction, the voltage division ratio does not change and the voltage division result does not change. The detection error of the comparator 42 is therefore small, and high precision control is possible.

(8) Because the voltage divider 41 is a load of the power supply circuit 30, the threshold voltage of the field effect transistor 31 in the power supply circuit 30 can be set low and the size (area) can also be reduced.

Furthermore, the motor drive voltage storage capacitor 60 can be prevented from being charged by the off leakage current from the primary power supply when the field effect transistor 31 is off, and the motor drive voltage can be controlled to a stable constant voltage.

(9) Furthermore, because a primary power supply drive mode and a constant voltage drive mode can be selected, the voltage appropriate to each motor 6, 7 can be applied and each motor 6, 7 can be efficiently driven when motors with different operating ranges are used as the motors 6 and 7. For example, if a motor with a relatively wide operating range is used as the first motor 6, a motor with a narrow operating range is used as the second motor 7, and the primary power supply drive mode is selected when driving the first motor 6, a heavy load can be driven and the first motor 6 can efficiently drive heavy time display hands 220. In addition, if the constant voltage drive mode is selected when driving the second motor 7, a motor 7 with a narrower operating range can be efficiently driven.

Embodiment 2

Figure 7:
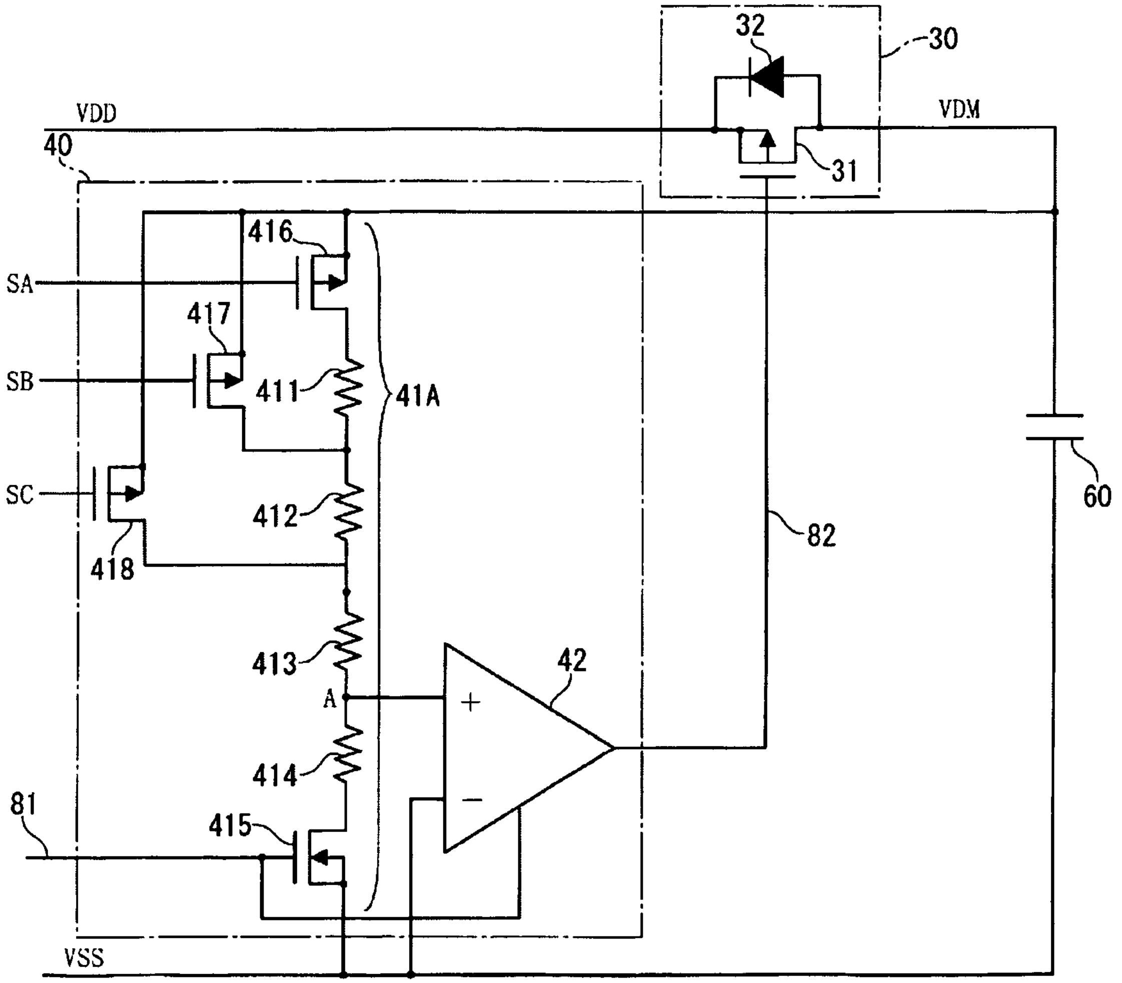
FIG. 7 is a circuit diagram showing the power supply control circuit in a second embodiment of the invention.

A second embodiment of the invention is described next with reference to FIG. 7.

This embodiment improves the voltage divider 41 of the power supply control circuit 40 in the first embodiment so that the motor drive voltage VDM of the motor drive voltage storage capacitor 60 can be set to a plurality of levels. Other aspects of this embodiment are the same as in the first embodiment, and further description thereof is omitted.

Similarly to the voltage divider 41 described above, the voltage divider 41A in this embodiment of the invention has four resistances 411 to 414 and a field effect transistor 415, and also has field effect transistors 416 to 418 that operate as switches disposed between resistances 411 to 413 and the motor drive voltage VDM power supply line. The field effect transistors 416 to 418 are switched on/off by switching signals SA to SC applied by the control logic circuit 24 in response to software commands from the CPU 23, and can thus switch the voltage division ratio of the voltage divider 41A.

When switching signal SB turns transistor 417 on, the voltage produced at node A results from voltage dividing the motor drive voltage VDM based on the ratio between the resistance of the serial resistances 412 and 413 and the resistance of resistance 414, and this voltage is compared with the reference voltage by the comparator 42.

If switching signal SA turns transistor 416 on, resistances 411 to 413 are connected in series and the voltage drop of the voltage VDM is even greater. The detection voltage when transistor 416 is turned on by switching signal SA is therefore higher than the detection voltage when transistor 417 is turned on by the switching signal SB.

However, when transistor 418 is turned on by switching signal SC, the voltage drop is determined by resistance 413 alone. The detection voltage when transistor 418 is turned on by switching signal SC is therefore lower than the detection voltage when transistor 417 is turned on by switching signal SB.

The constant voltage that is supplied as the motor drive voltage can thus be switched between three levels.

This second embodiment of the invention switches the constant voltage between three levels, but the constant voltage can be switched between two or four or more levels by appropriately adjusting the number of resistances and transistor switches.

In addition to the effects achieved by the first embodiment described above, this second embodiment also has the following effect.

(2-1) Because the constant voltage that is the motor drive voltage can be switched between three levels, the constant voltage optimal for the motor 6, 7 that is used can be set, and the motor 6, 7 can be driven efficiently.

Embodiment 3

A third embodiment of the invention is described next.

An electronic timepiece with a power generator 1B according to a third embodiment of the invention differs from the foregoing embodiments primarily in additionally having a self-winding generating mechanism and a generator output display mechanism. The arrangement of the semiconductor device 10 that controls driving the motors 6, 7 is the same as in the first embodiment, and further description thereof is thus omitted.

Figure 8:
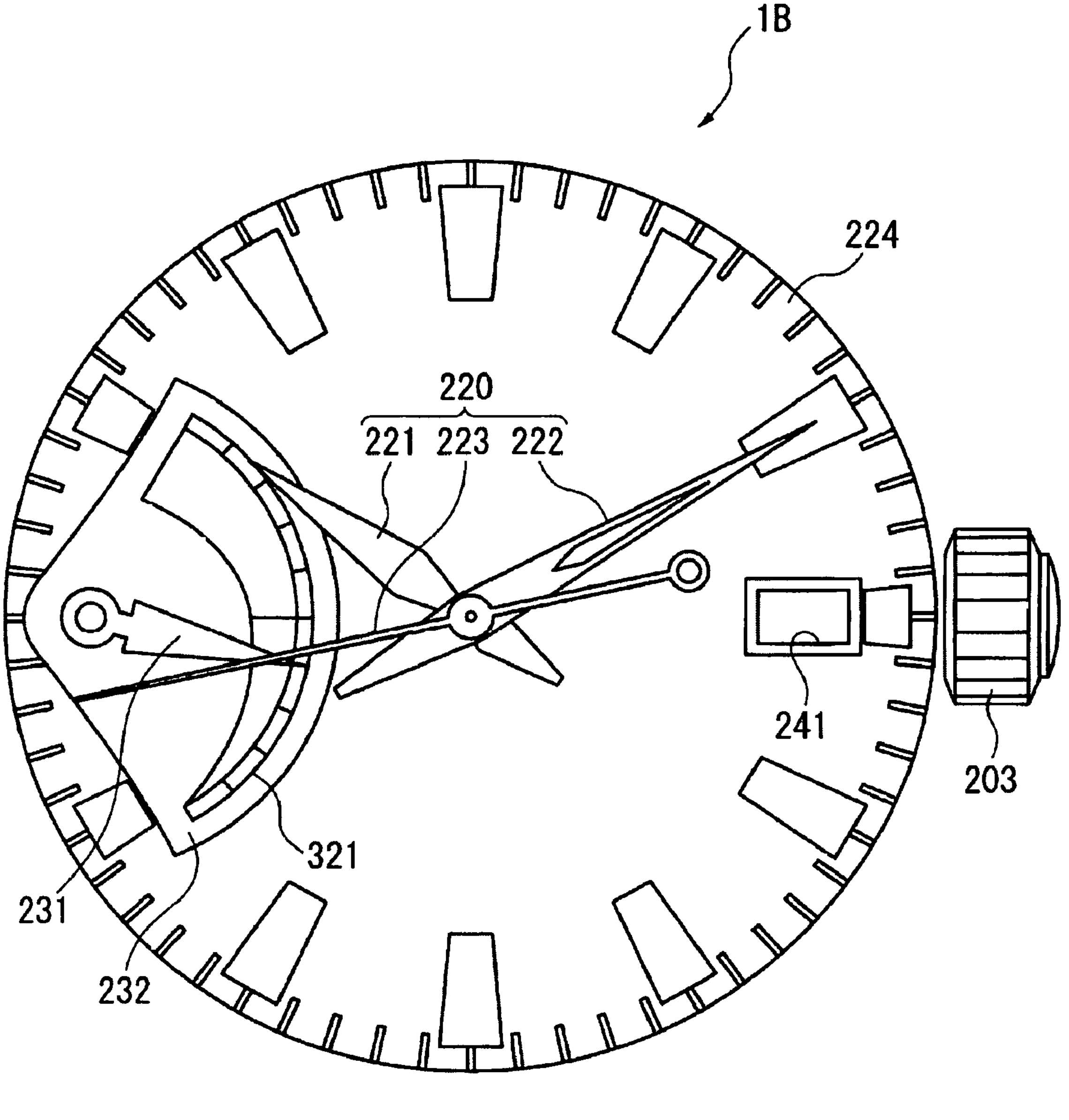
FIG. 8 is a frontal view of an electronic timepiece according to a third embodiment of the invention.

As shown in FIG. 8, the electronic timepiece 1B has time display hands 220 including an hour hand 221, a minute hand 222, and a second hand 223, and the time display hands 220 are driven by the first motor 6.

A display hand (sub-hand) 231 and power generation display dial 232 are disposed at the 9:00 o'clock position of the dial 224 of the electronic timepiece 1B. The display hand 231 is provided separately from the time display hands 220 for indicating the power generation state. The power generation display dial 232 has a prescribed number of graduations 321, and the power generation state can be displayed by driving the display hand 231 with the second motor 7 to point to a particular graduation 321.

A window 241 is also formed at the 3:00 o'clock position of the dial 224, and the date can be displayed by means of a date wheel disposed behind the dial 224. This date wheel is driven rotationally by a date wheel motor not shown.

The power generator 2 in this electronic timepiece 1B generates power by using the rotational energy of a rotary pendulum to cause a rotor to turn.

Power can also be generated by winding the crown 203 to turn the rotor of the power generator 2. A specific arrangement that enables generating power both automatically by means of a self-winding mechanism using a rotary pendulum and manually by using the crown 203 to turn the rotor is described in Japanese Patent Application 2006-276156 and Japanese Patent Application 2006-276157, both previously filed by the inventors.

The display hand 231 driven by the second motor 7 normally indicates the remaining operating time of the electronic timepiece 1B based on the electrical energy stored in the secondary battery 3, and is also controlled to display the generator output when power is produced manually by winding the crown 203.

Particularly when power is generated by manual winding, the second motor 7 must drive the display hand 231 quickly in forward and reverse directions. Compared with the first motor 6, which drives forward once a second, it is therefore extremely difficult to ensure that the second motor 7 has a wide operating voltage range relative to the variation in the primary power supply voltage VDD caused by charging.

As a result, when only the first motor 6 is driven, this electronic timepiece 1B controls the motor drive voltage to the same voltage as the primary power supply voltage VDD, and controls discharging by means of the second drive circuit 52 so that the motor drive voltage is set to a constant voltage for both the first motor 6 and the second motor 7 when both the first motor 6 and the second motor 7 are driven.

The motor drive control process in this embodiment of the invention is described next with reference to the flow charts in FIG. 9 and FIG. 10 and the timing chart in FIG. 11.

When the process starts, the power supply control circuit 40 is not operating, the power supply circuit 30 is therefore on, and the motor drive voltage VDM is equal to the primary power supply voltage VDD (step S1).

The CPU 23 then controls the first motor 6 by means of the first drive control circuit 25 and the first drive circuit 51 to drive the movement every second and display the time by means of the time display hands 220. The CPU 23 also drives the second motor 7 by means of the second drive control circuit 26 and the second drive circuit 52 to display the current remaining operating time (duration time) by means of the display hand 231 (step S2).

This remaining operating time (duration time) can be determined by calculation based on the detected voltage of the secondary battery 3, or by integrating the output current of the power generator 2, that is, the charge current input to the secondary battery 3.

Furthermore, because each graduation of the graduation 321 corresponds to a prescribed time, such as one day, once the display hand 231 has been driven to indicate the duration time, the display position remains the same until the duration time changes. More specifically, if each graduation of the duration time equals one day, the second motor 7 can be driven to move the display hand 231 up or down one graduation appropriately when one day passes without power being generated and the duration time thus decreases one day, or when power is generated and the duration time increases an amount equal to one day. When there is no change in the displayed duration time, driving the second motor 7, and therefore moving the display hand 231, stops.

A method such as taught in Japanese Patent Application 2007-065646 previously filed by the inventors can be used to calculate and display the duration time (remaining operating time).

The CPU 23 then determines if power is being generated manually (step S3). If power is generated manually, the CPU 23 executes the generator output display process (step S4).

Whether power is generated manually can be determined by, for example, detecting rotation of the crown 203 or based on the characteristic change in the generator output current when power is manually produced.

Figure 10:
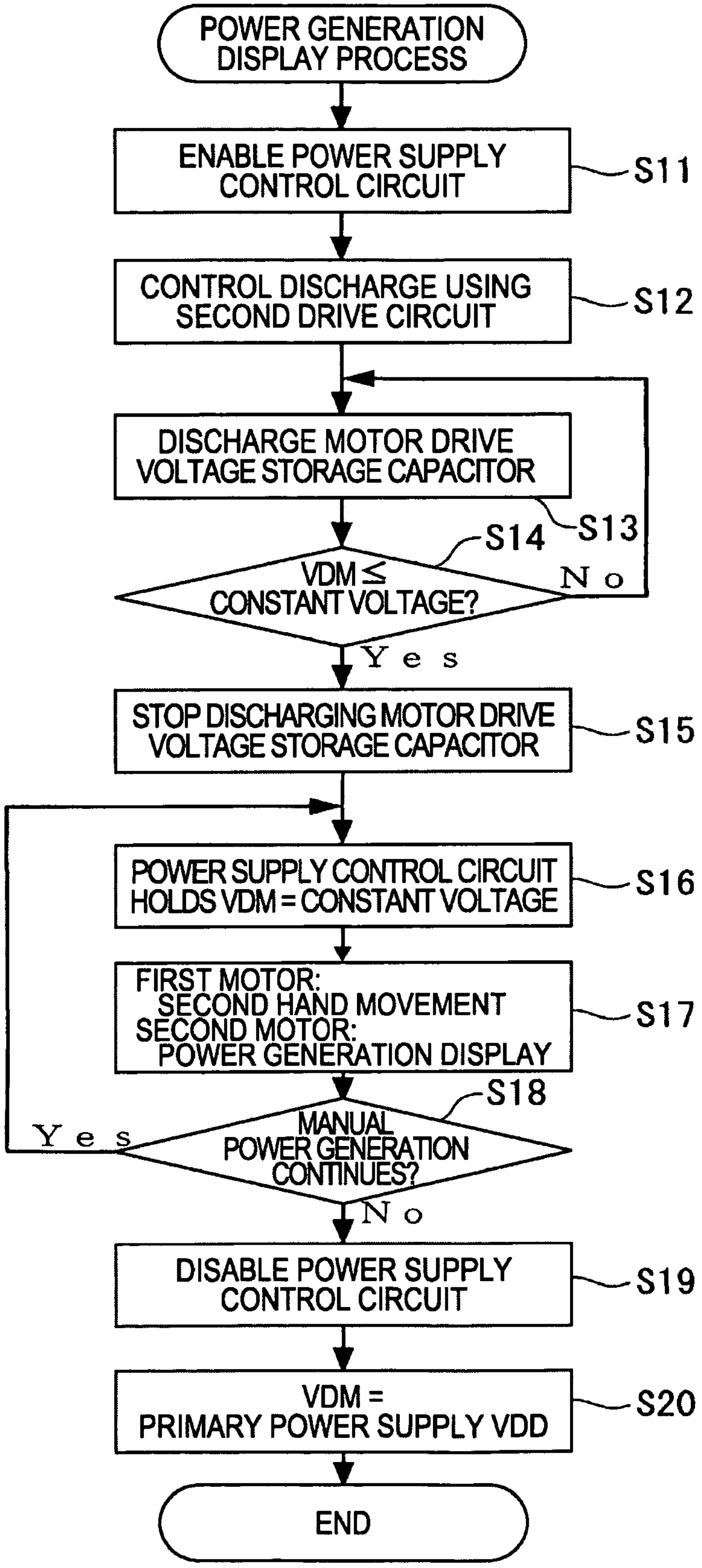
FIG. 10 is a flow chart of the power generation display process in FIG. 9.

When the generator output display process executes, the CPU 23 activates the power supply control circuit 40 by means of the control logic circuit 24 as shown in FIG. 10 (step S11).

The CPU 23 then causes the control logic circuit 24 to output the discharge start signal 85 to the second drive control circuit 26 and proceeds to control discharging by means of the second drive circuit 52 (step S12).

The second drive control circuit 26 outputs the motor drive pulses P21 to P24 to the second drive circuit 52 for using the second drive circuit 52 as the discharge circuit in order to discharge the charge stored in the motor drive voltage storage capacitor 60 (step S13). More specifically, the second drive control circuit 26 sets the motor drive pulses P22 and P23 high and holds the motor drive pulses P21 and P24 low as shown in FIG. 11. As a result, the electrical energy charged to the motor drive voltage storage capacitor 60 is discharged through the second drive circuit 52.

The comparator 42 of the power supply control circuit 40 then determines if the motor drive voltage VDM is less than or equal to the constant voltage (step S14). If step S14 returns no, control returns to step S13 and discharging the motor drive voltage storage capacitor 60 continues. As a result, the motor drive voltage storage capacitor 60 discharge process (S13) continues until VDM≦the constant voltage.

Driving the first motor 6 and the second motor 7 is prohibited while the motor drive voltage storage capacitor 60 is being discharged.

When the power supply control circuit 40 determines that VCM≦constant voltage (step S14), the power supply control circuit 40 outputs the discharge stop signal 83 to the control logic circuit 24, the control logic circuit 24 stops discharging through the second drive circuit 52 by means of the second drive control circuit 26, and the motor drive voltage storage capacitor 60 discharge process ends (step S15).

The CPU 23 then uses the power supply control circuit 40 to control the motor drive voltage VDM to the constant voltage (step S16). More specifically, as shown in FIG. 11, when the motor drive voltage VDM drops below the detection voltage (constant voltage) of the comparator 42, the on/off control signal 82, which is the output signal of the comparator 42, goes low, the field effect transistor 31 turns on, the motor drive voltage storage capacitor 60 is charged by the primary power supply voltage VDD, and the motor drive voltage VDM also rises.

When the motor drive voltage VDM rises to or above the constant voltage, the on/off control signal 82 goes high, the field effect transistor 31 turns off, and the voltage VDM drops as the motor is driven.

Figure 11:
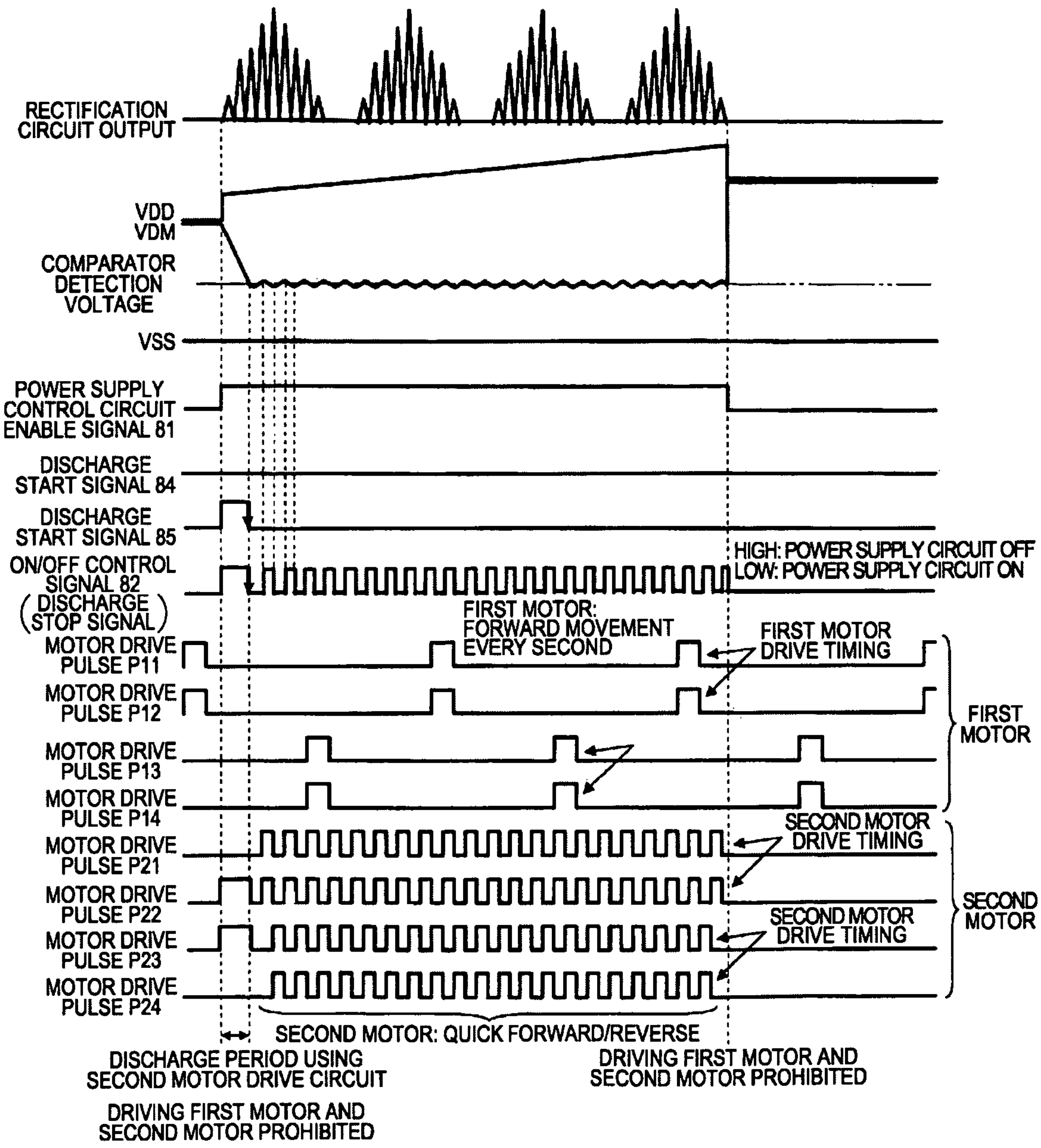
FIG. 11 is a timing chart describing the power generation display process in the third embodiment of the invention.

By thus switching the field effect transistor 31 on and off according to the change in the motor drive voltage VDM, the motor drive voltage VDM is held substantially constant at the detection voltage of the comparator 42, that is, the constant voltage, as shown in FIG. 11.

The CPU 23 then controls the movement each second by means of the first motor 6 and controls driving the power generation state by means of the second motor 7 (step S17).

More specifically, the CPU 23 controls the motor drive pulses P11 to P14 output from the first drive control circuit 25 to move the first motor 6 forward once a second and move the time display hands 220 in steps.

The CPU 23 also controls the motor drive pulses P21 to P24 output from the second drive control circuit 26 so that the second motor 7 moves quickly forward and reverse to display the power generation state.

For example, as shown in the first line in FIG. 11, the rectification circuit output is sampled at a prescribed sampling rate, the average output current of each sample is determined, and the display hand 231 is moved according to the generated current output. A method such as taught in Japanese Patent Application 2007-065646 previously filed by the inventors can be used to control displaying the generator output.

The CPU 23 then determines if manual electrical generation continues (step S18). If manual generation continues, steps S16 and S17 repeat.

If manual generation has ended, the CPU 23 sets the Enable signal 81 low as shown in FIG. 11 and stops the power supply control circuit 40 (step S19).

By thus disabling the power supply control circuit 40, the field effect transistor 31 turns on and the voltage VDM goes to the same voltage as the primary power supply voltage VDD (step S20).

This ends the power generation display process S4.

Figure 9:
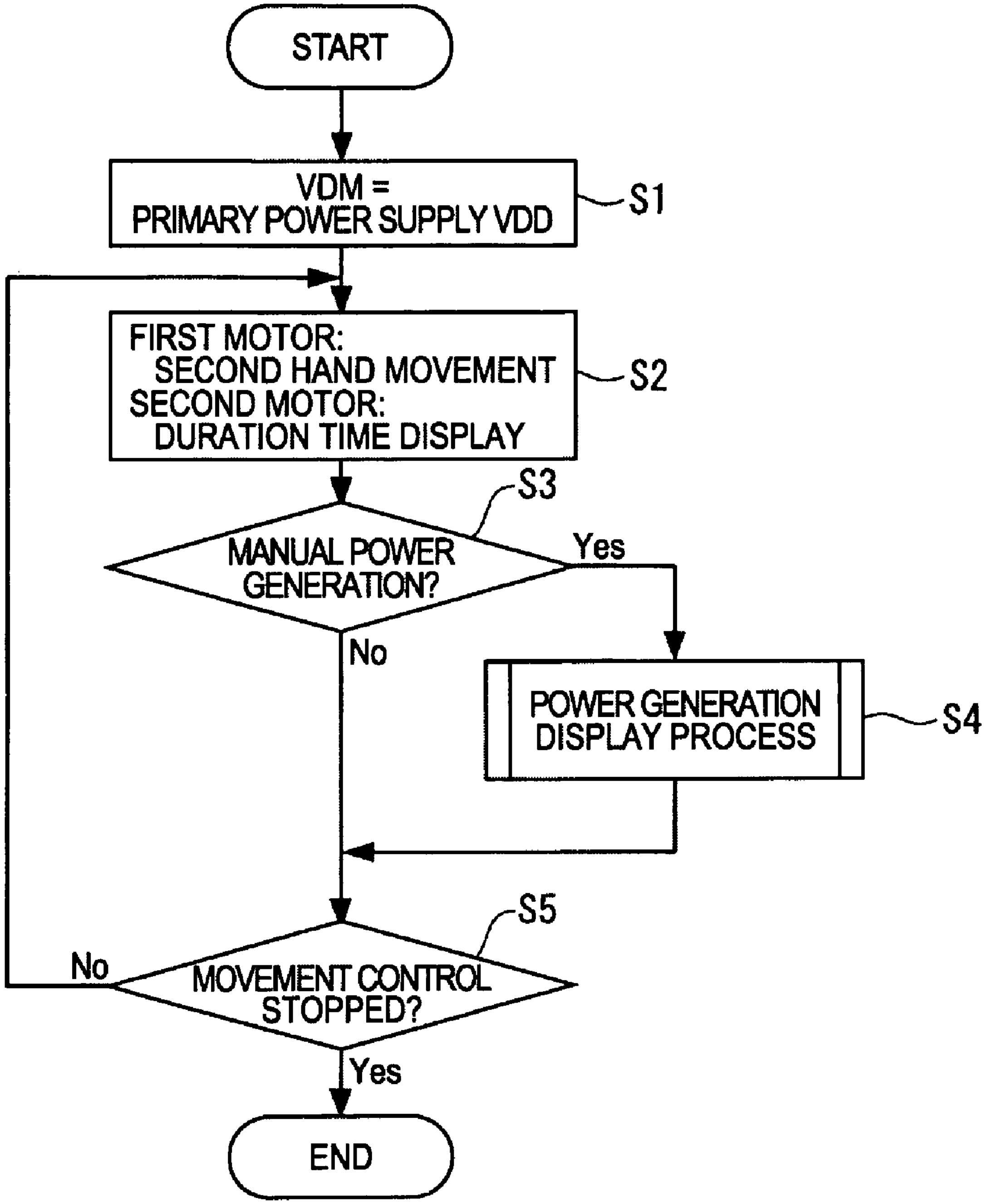
FIG. 9 is a flow chart of the movement control process in the third embodiment of the invention.

As shown in FIG. 9, when the power generation display process S4 ends, or when step S3 determines that power is not being manually generated, the CPU 23 determines if movement control has stopped (step S5). If movement control has stopped it is not possible to continue driving the movement because, for example, power has not been generated for a long time and the secondary battery 3 voltage has dropped below the voltage level required to drive the semiconductor device 10.

Control therefore ends if step S5 determines that movement control has stopped. If movement control has not stopped, control returns to step S2, and controlling the movement by means of the first motor 6 and displaying the duration time by means of the second motor 7 continues.

In addition to the effects described above, this embodiment of the invention also has the following effect.

(3-1) When power is generated manually, the generator output current fluctuates greatly as shown in the first line in FIG. 11. As a result, the second motor 7 that drives the display hand 231 displaying the generation state must be driven quickly in both forward and reverse directions as indicated by the motor drive pulses P21 to P24 in FIG. 11. Because the motor drive voltage VDM is controlled to the prescribed constant voltage when the second motor 7 is driven in this embodiment, the second motor 7 can be reliably and stably driven quickly forward and reverse.

(3-2) Constant voltage control is used only during manual power generation, and the motors are otherwise driven in the primary power supply drive mode. Power consumption is therefore reduced compared with when constant voltage control is always used and energy is consumed for control and current is also discharged.

Furthermore, because variation in the primary power supply voltage is low except when power is manually generated, the motors 6, 7 can be driven reliably and stably at the primary power supply voltage VDD. Note that the second motor 7 can be driven with sufficient stability using the primary power supply voltage VDD when changing the power generation display because it is not necessary to move the display hand quickly forward and reverse as it is when displaying the power generation state.

(3-3) Because the electronic timepiece with a power generator 1 has a display hand 231 that moves according to the power generation state (generated current), the user can confirm the output status of the power generator 2 in real time. The user can therefore confirm if sufficient power is generated when driving the generator manually, and by winding the generator while confirming generator output, the user can reliably generate power manually.

(3-4) Because power generation is displayed using a display hand 231 separate from the time display hands 220, both the time and the power generation state can be displayed at the same time. Convenience is thus improved compared with using the time display hands 220 to also display the power generation state.

Furthermore, because power generation can be displayed by a display hand 231, the power generation state can be visually displayed in real time similarly to a tachometer, and the user can visually and easily determine the power generation state.

(3-5) The display hand 231 normally displays the duration time, and displays the power generation state when power is produced. Information that is closely related can therefore be displayed using the same display hand 231, and the user of the electronic timepiece 1B can easily read the information. Furthermore, because the display hand 231 is used to display different information, it is not necessary to increase the number of display hands and motors, and the arrangement of the electronic timepiece 1B can thus be simplified.

Furthermore, the user can determine how much longer the electronic timepiece 1B can continue operating without generating power because the duration time is normally displayed, can therefore drive the generator to produce power before the timepiece stops, and can thus prevent the timepiece from stopping.

The invention is not limited to the embodiments described above, and variations and improvements achieving the same object are included in the scope of the invention.

Figure 12:
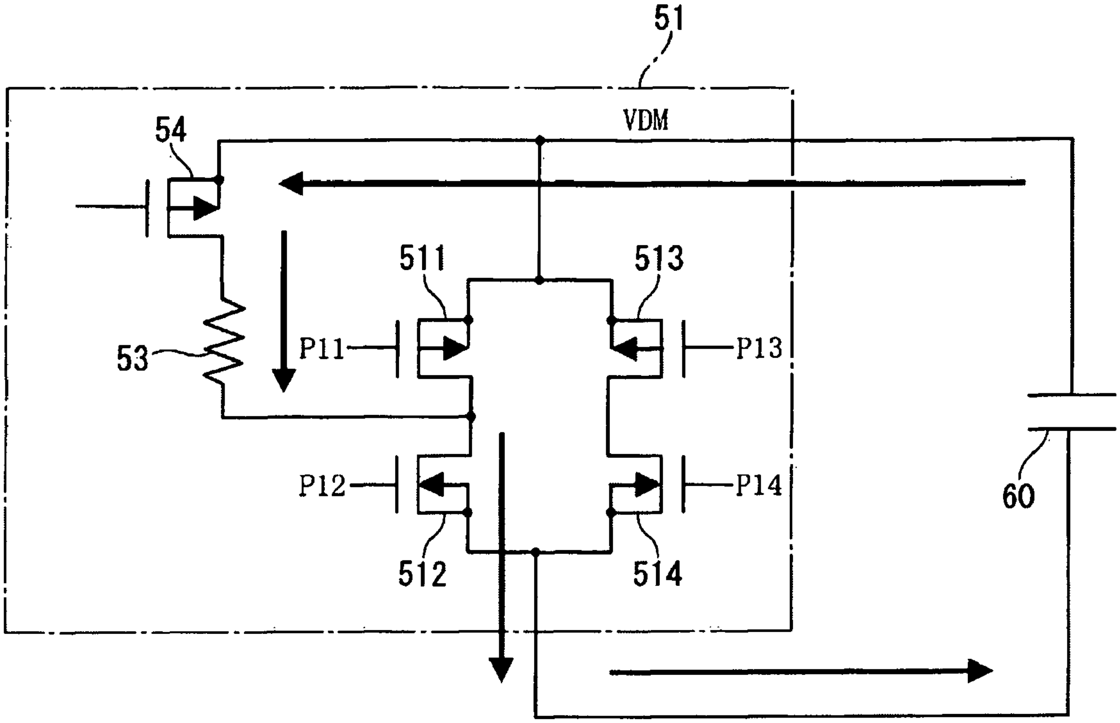
FIG. 12 is a circuit diagram of a variation of the discharge unit.

For example, the discharge unit is not limited to using the motor drive circuits 51, 52 as in the foregoing embodiments, and a rotation detection resistance disposed to the drive circuits 51, 52 can be used for the discharge unit. As shown in FIG. 12, for example, when electrical energy is discharged using the rotation detection resistance 53 disposed in drive circuit 51, a field effect transistor 54 connected to the resistance 53 turns on, field effect transistor 512 turns on, the other transistors 511, 513, and 514 turn off, and electrical energy charged to the motor drive voltage storage capacitor 60 is discharged through the transistor 54, resistance 53, and field effect transistor 512.

Figure 13:
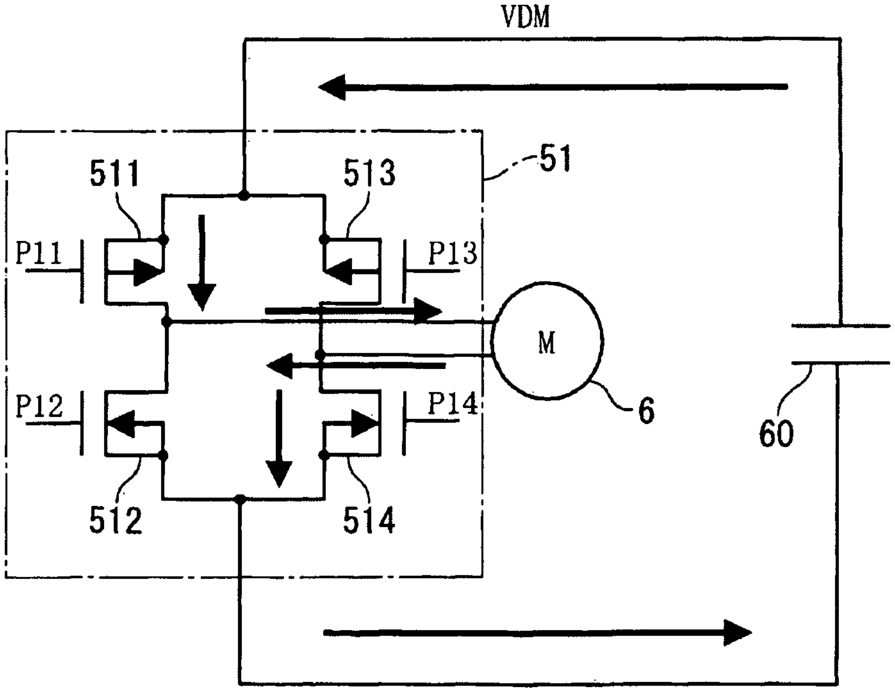
FIG. 13 is a circuit diagram of another variation of the discharge unit.

The discharge unit could alternatively use the resistance of the motor coil to discharge energy. For example, if the first motor 6 is used to discharge electrical energy as shown in FIG. 13, electrical energy charged to the motor drive voltage storage capacitor 60 is discharged through transistor 511, the motor coil resistance, and transistor 514 when field effect transistors 511 and 514 are on and field effect transistors 512 and 513 are off. Note that because the discharge control time is extremely short and there is not enough energy to drive the motor 6, the motor 6 will not be driven when electrical energy is discharged using the motor coil resistance.

Furthermore, the motor 6 can be even more effectively prevented from being driven during discharge control if current is discharged at the opposite polarity as the polarity of motor 6 rotation. For example, if set to the polarity of motor 6 rotation when the field effect transistors 512 and 513 are on, power can be reliably discharged without the motor 6 being driven by discharge control if discharge control turns the field effect transistors 511 and 514 on.

An arrangement having dedicated discharge elements such as resistance devices and constant current devices can be provided as the discharge unit to discharge energy without using the drive circuits 51, 52. Using dedicated discharge elements has the advantage of easily adjusting the discharge level.

The drive voltage of each motor 6, 7 is adjusted to the same constant voltage in the foregoing embodiments, but a different constant voltage can be set for each motor 6, 7. More specifically, if plural motors are present, it may be necessary to set a different constant voltage for each motor according to the application and characteristics of the motors. In this case, a power supply circuit 30, a power supply control circuit 40, and a motor drive voltage storage capacitor 60 are provided for each motor drive circuit 51, 52, and the constant voltage is controlled separately for each motor.

The foregoing embodiments can switch control between a primary power supply drive mode and a constant voltage drive mode, but the constant voltage drive mode can be used constantly according to the type, drive speed, and other characteristics of the controlled motor 6, 7.

The foregoing embodiments have two motors 6, 7, but the invention can also be used when there is only one motor and when there are three or more motors.

The power generator 2 is not limited to having a manually wound generator and a self-winding generator as described in the above embodiments. More particularly, the power generator 2 could be a self-winding generator that does not include a manual winding mechanism and is powered only by a rotary pendulum, a solar generator that converts light energy to electrical energy, a thermal generator that produces power from thermal energy, a piezoelectric generator that uses the piezoelectric effect, a generator that produces power by induction of stray external radio waves, or other type of generator. The electronic timepiece 1, 1B can further incorporate one type of generator or plural types of generators as described in the foregoing embodiments.

The invention is further not limited to having a power generating device, and can be used, for example, in an electronic timepiece with a storage device that stores electrical energy produced by an external generator in the internal storage device and is driven by the stored energy. More specifically, the invention can also be used in an electronic timepiece that does not have its own generator and has a storage device such as an externally charged secondary battery 3.

The electronic timepiece 1 according to the invention can be a timepiece that has a liquid crystal display, an organic electroluminescent display, an electrophoretic display, or other type of display panel.

The invention is also not limited to wristwatches, and can be used in any type of timepiece that has a motor, including pocket watches, table clocks, and wall clocks. The invention can also be used in various types of electronic devices other than timepieces.

The invention can also be packaged and sold as a semiconductor device (semiconductor element or IC device), and the semiconductor device 10 according to the invention can be incorporated in other electronic devices by other manufacturers.

More particularly, the invention can be widely used in applications that have a primary power supply with a variable power supply voltage, such as a secondary battery 3 that is charged by a power generator or an external device, and that must drive a motor with a constant voltage.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A motor drive control circuit that operates using a primary power supply and controls driving a motor, comprising:

a drive circuit that drives the motor;

a power supply circuit that is disposed between the primary power supply and the drive circuit, and uses electrical energy supplied from the primary power supply to supply a drive voltage to the drive circuit, the power supply circuit having a field effect transistor of which the drain or the source is connected directly or indirectly to the primary power supply and the other of the drain and the source is connected to a power supply line of the drive circuit; and a power supply control circuit that controls operation of the power supply circuit;

wherein the power supply control circuit monitors the drive voltage, stops the power supply circuit and stops supplying electrical energy from the primary power supply to the drive circuit by controlling signal input to the gate of the field effect transistor to turn the field effect transistor off to stop supply of the drive voltage when the drive voltage is greater than or equal to a prescribed constant voltage, and activates the power supply circuit and supplies electrical energy from the primary power supply to the drive circuit by controlling signal input to the gate of the field effect transistor to turn the field effect transistor on to supply the drive voltage when the drive voltage is less than the prescribed constant voltage.

2. The motor drive control circuit described in claim 1, further comprising:

a discharge unit for discharging electrical energy stored in a storage device that stores electrical energy supplied from the power supply circuit;

wherein the power supply control circuit activates the discharge unit to lower the storage device voltage to the prescribed constant voltage when the storage device voltage is greater than or equal to the prescribed constant voltage.

3. The motor drive control circuit described in claim 2, wherein:

the discharge unit discharges electrical energy in the storage device using the motor drive circuit.

4. The motor drive control circuit described in claim 1, wherein:

the power supply control circuit can select a primary power supply drive mode that drives the drive circuit at the primary power supply voltage, and a constant voltage drive mode that drives the drive circuit at the prescribed constant voltage, activates the power supply circuit to supply electrical energy from the primary power supply to drive the drive circuit when the primary power supply drive mode is selected, and when the constant voltage drive mode is selected monitors the drive voltage, stops the power supply circuit and stops supplying the drive voltage when the drive voltage is greater than or equal to a prescribed constant voltage, and activates the power supply circuit and supplies the drive voltage when the drive voltage is less than the prescribed constant voltage.

5. The motor drive control circuit described in claim 1, wherein:

the field effect transistor has a parasitic diode, and the parasitic diode is disposed with the anode connected to the power supply line of the drive circuit, and the cathode connected to the primary power supply.

6. The motor drive control circuit described in claim 1, wherein:

the off leakage current of the field effect transistor is set to be less than the load current of the power supply circuit when the motor is not driven.

7. The motor drive control circuit described in claim 6, wherein:

the threshold voltage of the field effect transistor is set low in the range satisfying the condition that the off leakage current of the field effect transistor is less than the load current of the power supply circuit when the motor is not driven.

8. The motor drive control circuit described in claim 6, wherein:

a load other than the motor is connected to the output line of the power supply circuit so that the off leakage current of the field effect transistor is less than the load current of the power supply circuit when the motor is not driven.

9. The motor drive control circuit described in claim 1, wherein:

the power supply control circuit includes a comparator that compares a prescribed reference voltage with power supply circuit output; and the comparator constantly compares power supply circuit output with the reference voltage, and based on the result of the comparison controls activating and deactivating the power supply circuit.

10. The motor drive control circuit described in claim 9, wherein:

the comparator includes a voltage divider that voltage divides the power supply circuit output in one or multiple levels.

11. The motor drive control circuit described in claim 10, wherein:

a load other than the motor is connected to the output line of the power supply circuit so that the off leakage current of the field effect transistor is less than the load current of the power supply circuit when the motor is not driven; and the load is the voltage divider of the comparator.

12. A semiconductor device comprising the motor drive control circuit described in claim 1.

13. The semiconductor device described in claim 12, wherein:

the semiconductor device is a microprocessor having a central processing unit.

* * * * *